US012655005B2

(12) United States Patent
White

(10) Patent No.: US 12,655,005 B2
(45) **Date of Patent: *Jun. 16, 2026**

(54) HYDRAULIC SYSTEM FOR A VEHICLE

(71) Applicant: Oshkosh Corporation, Oshkosh, WI (US)

(72) Inventor: Mark White, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/949,571

(22) Filed: Nov. 15, 2024

(65) Prior Publication Data

US 2025/0074756 A1 Mar. 6, 2025

Related U.S. Application Data

(63) Continuation of application No. 18/367,318, filed on Sep. 12, 2023, now Pat. No. 12,172,879, which is a continuation of application No. 17/675,810, filed on Feb. 18, 2022, now Pat. No. 11,787,678.

(60) Provisional application No. 63/151,359, filed on Feb. 19, 2021.

(51) Int. Cl.

| | |
|---|---|
| ***B66F 9/22*** | (2006.01) |
| ***B66F 9/065*** | (2006.01) |
| ***B66F 9/075*** | (2006.01) |
| ***E02F 9/22*** | (2006.01) |
| ***F15B 11/16*** | (2006.01) |
| ***F15B 13/02*** | (2006.01) |

(52) U.S. Cl.

CPC .............. *B66F 9/22* (2013.01); *B66F 9/0655* (2013.01); *B66F 9/07572* (2013.01); *E02F 9/2239* (2013.01); *E02F 9/2242* (2013.01); *E02F 9/2253* (2013.01); *F15B 11/162* (2013.01); *F15B 13/022* (2013.01); *F15B 2211/781* (2013.01)

(58) Field of Classification Search

CPC ...... B66F 9/0655; B66F 9/07572; B66F 9/22; E02F 9/2239; E02F 9/2242; E02F 9/2253; F15B 11/162; F15B 13/022; F15B 2211/781

See application file for complete search history.

(56) References Cited

U.S. PATENT DOCUMENTS

| | | | |
|---|---|---|---|
| 5,165,233 | A | 11/1992 | Betz |
| 9,217,447 | B2 | 12/2015 | Dybing |
| 2002/0073699 | A1 | 6/2002 | Nishimura et al. |

(Continued)

*Primary Examiner* — Matthew Wiblin
(74) *Attorney, Agent, or Firm* — Foley & Lardner LLP

(57) ABSTRACT

A lift device includes a hydraulic actuator configured to move an implement relative to a chassis, an implement circuit including a first pump coupled to the hydraulic actuator, a charge circuit including a second pump configured to selectively provide a flow of pressurized fluid to the implement circuit, a valve assembly fluidly coupled to the implement circuit and the charge circuit, and processing circuitry. The processing circuitry is configured to: in a first mode of operation, control the valve assembly to direct the flow of pressurized fluid to the charge circuit; in a second mode of operation, control the valve assembly to divert the flow of pressurized fluid to the implement circuit; and reconfigure the lift device between the first mode of operation and the second mode of operation in response to a command for the hydraulic actuator to at least one of move or reconfigure the implement.

20 Claims, 12 Drawing Sheets

(56) References Cited

U.S. PATENT DOCUMENTS

| | | | |
|---|---|---|---|
| 2007/0062186 | A1 | 3/2007 | Wuthrich et al. |
| 2007/0240928 | A1 | 10/2007 | Coltson et al. |
| 2010/0131163 | A1 | 5/2010 | Shinohara |
| 2013/0280111 | A1 | 10/2013 | Hoxie et al. |
| 2014/0020370 | A1 | 1/2014 | Berg |

HYDRAULIC SYSTEM FOR A VEHICLE

CROSS-REFERENCE TO RELATED PATENT APPLICATION

This application is a continuation of U.S. application Ser. No. 18/367,318, filed on Sep. 12, 2023, which is a continuation of U.S. application Ser. No. 17/675,810, filed on Feb. 18, 2022, now U.S. Pat. No. 11,787,678, which claims the benefit of and priority to U.S. Provisional Application No. 63/151,359, filed on Feb. 19, 2021, the entire disclosures of which are hereby incorporated by reference herein.

BACKGROUND

The present disclosure relates generally to a hydraulic system. More specifically, the present disclosure relates to a hydraulic system for controlling a vehicle, such as a lift device. Some vehicles include hydraulic systems that power propulsion of the vehicle, as well as movement of an implement. Based on the operating conditions of the vehicle, the propulsion and the movement of the implement may be more or less in demand at any given time.

SUMMARY

At least one embodiment relates to a vehicle. The vehicle includes a chassis, an implement coupled to the chassis, a hydraulic actuator configured to move the implement relative to the chassis, a tractive element coupled to the chassis, a hydraulic motor configured to drive the tractive element to propel the vehicle, a drive pump fluidly coupled to the hydraulic motor, a charge pump coupled to the chassis and configured to provide a flow of pressurized fluid, and a valve assembly fluidly coupled to the charge pump. The valve assembly is configured to (a) direct a first portion of the flow of pressurized fluid to the drive pump and (b) selectively direct a second portion of the flow of pressurized fluid to the hydraulic actuator.

Another embodiment relates to a lift device including a chassis, a boom coupled to the chassis, a hydraulic actuator coupled to the boom and the chassis and configured to move the boom relative to the chassis, a first pump coupled to the chassis, a second pump coupled to the chassis and configured to provide a flow of pressurized fluid to the first pump, and a valve assembly fluidly coupled to the first pump, the second pump, and the hydraulic actuator. In a first mode of operation, all of the flow from the second pump is provided to the first pump. In a second mode of operation, the valve assembly diverts a portion of the flow from the second pump to the hydraulic actuator.

Another embodiment relates to a method of operating a lift device. The method includes (a) providing, by a charge pump, a first flow of pressurized fluid, (b) receiving, by a user interface, a first request from a user to propel the lift device, and (c) directing, by a valve assembly, all of the first flow of pressurized fluid to a drive pump in response to receiving the first request. The drive pump is configured to power a hydraulic motor to propel the lift device. The method further includes (a) providing, by the charge pump, a second flow of pressurized fluid, (b) receiving, by the user interface, a second request from the user to move a boom assembly of the lift device, and (c) in response to receiving the second request, both (i) directing, by the valve assembly, a first portion of the second flow of pressurized fluid to the drive pump and (ii) directing, by the valve assembly, a second portion of the second flow of pressurized fluid to a hydraulic actuator coupled to the boom assembly.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a lift device (e.g., a telehandler) includes a hydraulic system that powers a boom assembly and drives tractive elements to propel the lift device. A primary driver (e.g., an engine, an electric motor, etc.) drives an implement pump, a charge pump, and a drive pump. The implement pump supplies pressurized fluid to (a) boom actuators that control movement of the boom assembly and (b) actuators that control steering of the tractive elements. The drive pump forms a hydrostatic circuit with a hydraulic motor that drives one or more of the tractive elements. The charge pump is fluidly coupled to the drive pump through a valve assembly. The charge pump supplies fluid to the drive pump to supplement fluid flow within the hydrostatic circuit.

When the lift device is driving (i.e., being propelled by the drive motor), the drive pump demands a relatively high flow rate of fluid from the charge pump. In such situations, the valve assembly directs all of the fluid flow from the charge pump to the drive motor. When the lift device is stationary or moving slowly, the demand of the drive pump is relatively low. In such situations, the valve assembly diverts a portion of the flow from the charge pump to the boom assembly actuators, supplementing the fluid provided by the implement pump. This permits the boom assembly to move more quickly than when the boom assembly actuators are powered by the implement pump alone, which can save the operator of the lift device time in certain situations. By way of example, a controller may energize or activate the valve assembly to divert a portion of the flow from the charge pump to the boom actuators when the boom assembly is being lifted upward or when the boom assembly is extending while the tractive elements are stationary. The valve assembly may be configured to limit the amount of flow that is diverted from the charge pump toward the boom actuators in order to maintain a threshold minimum flow rate from the charge pump to the drive pump whenever the telehandler is operating. Accordingly, the valve assembly is able to take advantage of surplus flow from the charge pump that would otherwise be wasted, and instead apply the charge flow to increase the movement speed of the boom assembly, saving time for the operator of the lift device.

Telehandler

Figure 1:
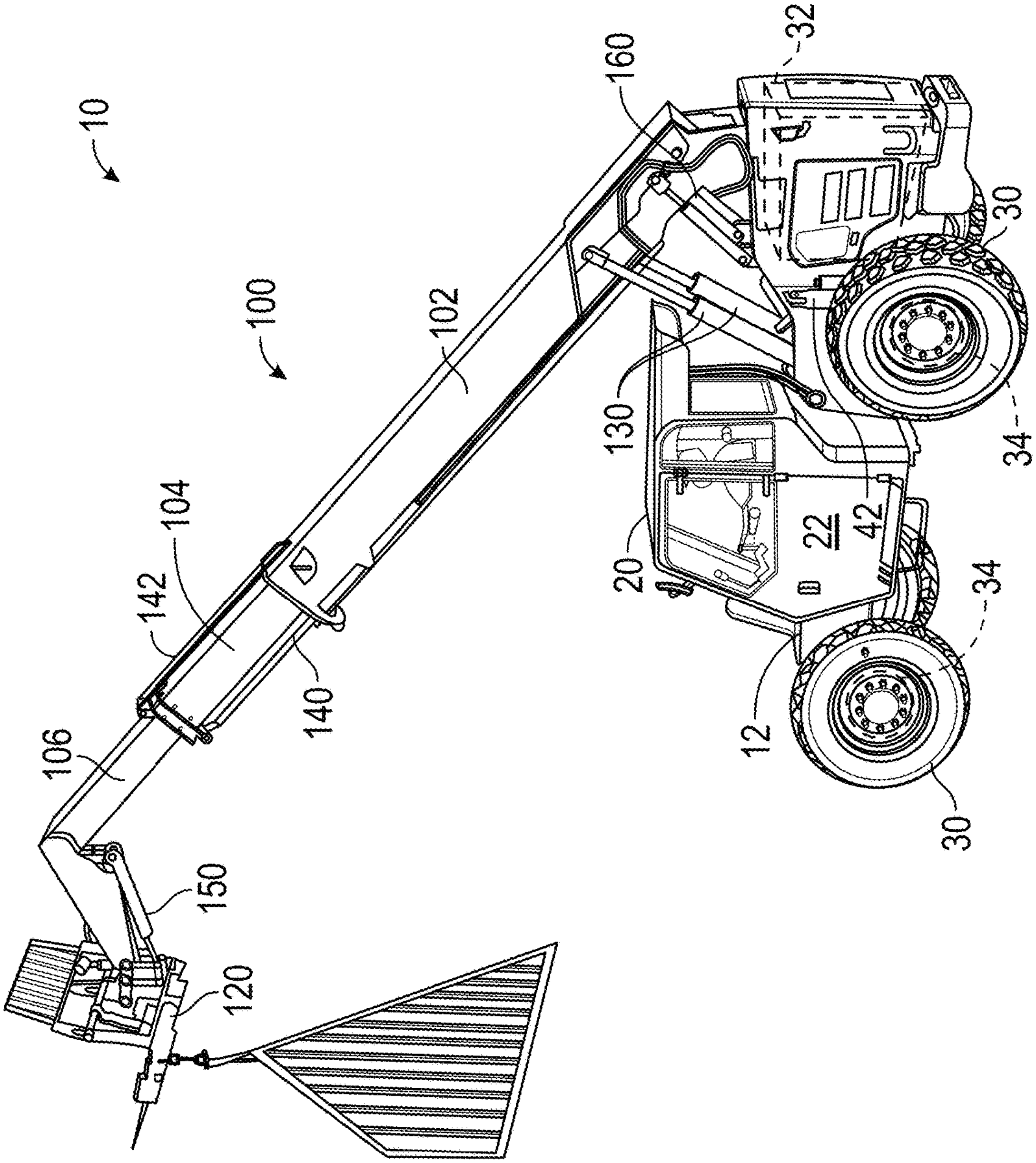
FIGS. 1 and 2 are perspective views of a telehandler, according to an exemplary embodiment.
Figure 2:
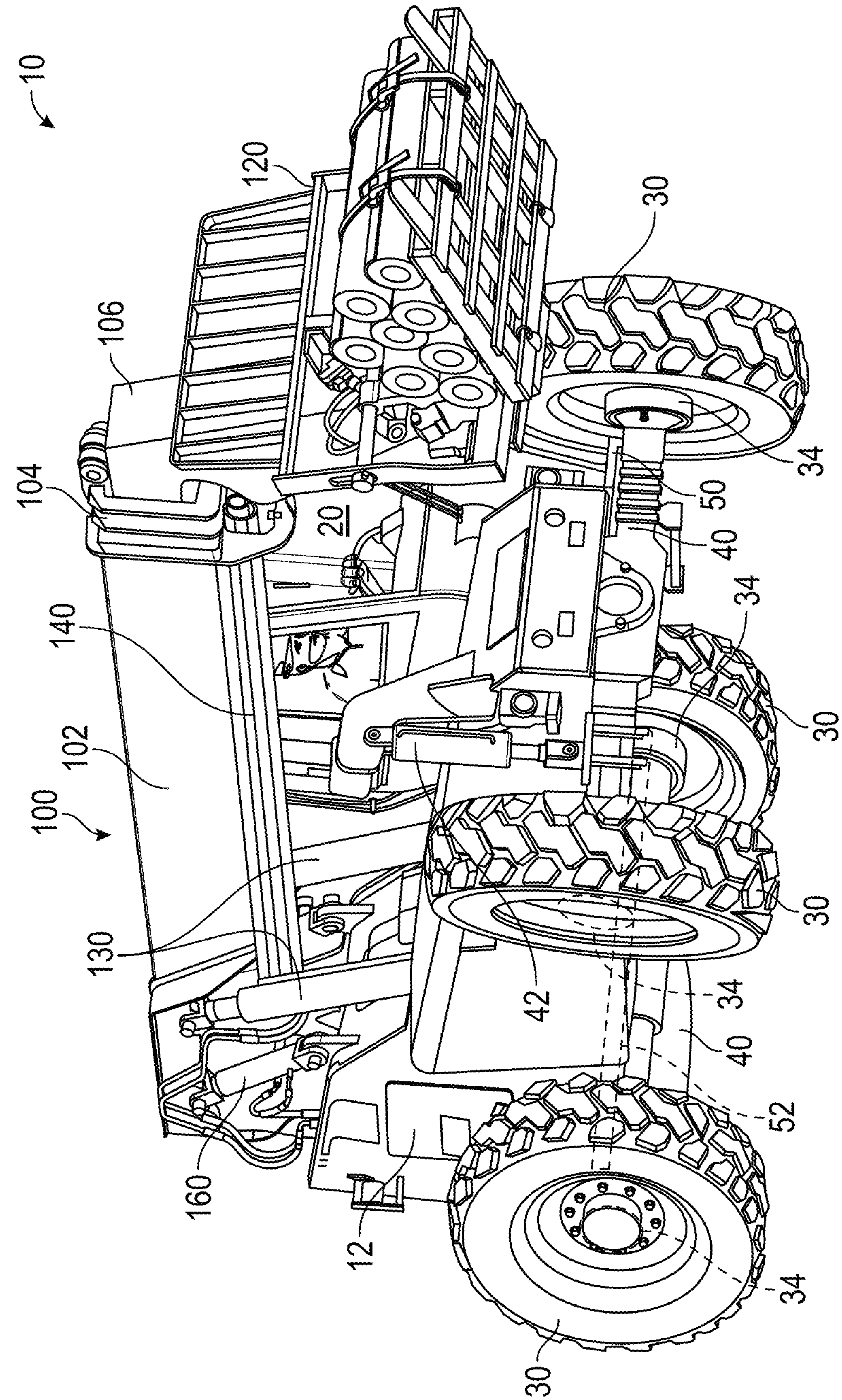

According to the exemplary embodiment shown in FIGS. 1 and 2, a vehicle or lift device, shown as telehandler 10, includes a chassis, shown as frame 12. The frame 12 supports an enclosure, shown as cabin 20, that is configured to house an operator of the telehandler 10. The telehandler 10 is supported by a plurality of tractive elements 30 that are rotatably coupled to the frame 12. One or more of the tractive elements 30 are powered to facilitate motion of the telehandler 10. A manipulator or lift assembly, shown as boom assembly 100, is pivotally coupled to the telehandler 10 near a rear end of the frame 12. The telehandler 10 is configured such that the operator controls the tractive elements 30 and the boom assembly 100 from within the cabin 20 to manipulate (e.g., move, carry, lift, transfer, etc.) a payload (e.g., pallets, building materials, earth, grains, etc.).

Although the vehicle shown and described herein is a telehandler 10, in other embodiments, the systems and methods described herein (e.g., the hydraulic system 200) are utilized with another type of vehicle. By way of example, the vehicle may be a work platform, a scissor lift, a vertical lift, a boom lift, or another type of lift device.

In some embodiments, the boom assembly 100 is approximately centered on a longitudinal centerline that extends along a length of the frame 12. Such a placement may facilitate an even weight distribution between the left and the right sides of the telehandler 10. The cabin 20 is laterally offset from the longitudinal centerline and the boom assembly 100. The cabin 20 includes a door 22 configured to facilitate selective access into the cabin 20. The door 22 may be located on the lateral side of the cabin 20 opposite the boom assembly 100.

Each of the tractive elements 30 may be powered or unpowered. In some embodiments, the telehandler 10 includes a powertrain system including a primary driver 32 (e.g., an engine, an electric motor, etc.). The primary driver 32 may receive fuel (e.g., gasoline, diesel, natural gas, etc.) from a fuel tank and combust the fuel to generate mechanical energy. According to an exemplary embodiment, the primary driver 32 is a compression-ignition internal combustion engine that utilizes diesel fuel. In alternative embodiments, the primary driver 32 is another type of device (e.g., spark-ignition engine, fuel cell, etc.) that is otherwise powered (e.g., with gasoline, compressed natural gas, hydrogen, etc.). Additionally or alternatively, the primary driver 32 includes an electric motor that receives electrical energy from one or more energy storage devices (e.g., batteries, capacitors, etc.) or an offboard source of electrical energy (e.g., a power grid, a generator, etc.). In some embodiments, one or more pumps (e.g., the charge pump 202, the implement pump 204, and the drive pump 206) receive the mechanical energy from the primary driver 32 and provide pressurized hydraulic fluid to power the tractive elements 30 and the other hydraulic components of the telehandler 10 (e.g., the lift cylinders 130, the telescoping cylinder 140, the tilt cylinder 150, the levelling cylinders 42, etc.). In the embodiment shown in FIGS. 1 and 2, the pumps provide pressurized hydraulic fluid to drivers or actuators (e.g., hydraulic motors), shown as drive motors 34, that are each coupled to one or more of the tractive elements 30 (e.g., in a hydrostatic transmission arrangement). The drive motors 34 each provide mechanical energy to one or more of the tractive elements 30 to propel the telehandler 10. In other embodiments, one drive motor 34 drives all of the tractive elements 30. In other embodiments, the primary driver 32 provides mechanical energy to the tractive elements 30 through another type of transmission.

Referring to FIGS. 1 and 2, the tractive elements 30 are coupled to the frame 12 by lateral support members, shown as axles 40. Specifically, the two frontmost tractive elements 30 are coupled to opposite ends of a first axle 40, and the two rearmost tractive elements 30 are coupled to opposite ends of a rear axle 40. The axles are pivotally coupled to the frame 12 and configured to pivot relative to the frame 12 about a longitudinal axis, facilitating roll of the frame 12 about the longitudinal axis. The telehandler 10 further includes a pair of linear actuators (e.g., hydraulic cylinders), shown as levelling cylinders 42, that are each coupled to one of the axles 40 and to the frame 12. The levelling cylinders 42 are configured to extend and retract to rotate the frame 12 relative to the axles 40, causing the frame 12 to roll. The levelling cylinders 42 may be controlled to level the frame 12 on sloped or uneven surfaces. In some embodiments, the levelling cylinders 42 are independently controlled to permit independent control of the front and rear of the frame 12.

In some embodiments, one or more of the tractive elements 30 are configured to be steered to control the movement of the telehandler 10. As shown in FIG. 2, the telehandler 10 includes a pair of steering actuators (e.g., hydraulic cylinders), shown as front steering cylinder 50 and rear steering cylinder 52. The front steering cylinder 50 is coupled to the frontmost axle 40 and coupled (e.g., by one or more tie rods) to each of the frontmost tractive elements 30. The front steering cylinder 50 is configured to translate laterally to rotate each of the front wheels about a corresponding vertical axis. When the front steering cylinder 50 moves in a first direction from a center position, the tractive elements 30 turn to steer the telehandler 10 to the left. When the front steering cylinder 50 moves in a second direction opposite the first direction from the center position, the tractive elements 30 turn to steer the telehandler 10 to the right. The rear steering cylinder 52 is coupled to the rearmost axle 40 and coupled to each of the rearmost tractive elements 30. The rear steering cylinder 52 provides steering control of the rearmost tractive elements 30. In some embodiments, the front steering cylinder 50 and the rear steering cylinder 52 are independently controlled. In some embodiments, the telehandler 10 utilizes a skidsteer arrangement (e.g., the tractive elements 30 on the left side of the telehandler 10 move at a different speed and/or in a different direction than the tractive elements 30 on the right side of the telehandler 10 to steer the telehandler 10).

Referring again to FIGS. 1 and 2, the boom assembly 100 is a telescoping assembly having a series of nested members including a proximal or base section 102, an intermediate or middle section 104, and a distal or fly section 106. The base section 102 is pivotally coupled to the rear end of the frame 12 such that the boom assembly 100 is pivotable about a lateral axis. The middle section 104 is received within the base section 102 and extends outward beyond the base section 102. The fly section 106 is received within the middle section 104 and extends outward beyond the middle section 104. In other embodiments, the middle section 104 is omitted, and the fly section 106 is received directly within the base section 102. In yet other embodiments, the boom assembly 100 includes multiple middle sections 104. The base section 102, the middle section 104, and the fly section 106 are each slidably coupled to one another to facilitate varying an overall length of the boom assembly 100. Specifically, the middle section 104 is slidably coupled to the base section 102, and the fly section 106 is slidably coupled to the middle section 104.

The boom assembly 100 further includes a tool, manipulator, interface or implement, shown as implement 120, coupled to a distal end of the fly section 106. The implement 120 may be pivotally coupled to the fly section 106 such that the implement 120 is pivotable relative to the fly section 106 about a lateral axis. The implement 120 may facilitate interfacing the boom assembly 100 with materials (e.g., wood, hay, building materials, etc.) or one or more operators or users. The implement 120 may be powered (e.g., by pressurized hydraulic fluid from the hydraulic system 200) or unpowered. As shown in FIGS. 1 and 2, the implement 120 is a fork that handles a truss in FIG. 1 and a pallet in FIG. 2. In other embodiments, the implement 120 is a bucket, a material handling arm, a boom, a hook, a hopper, a sweeper, a grapple, or another type of implement configured to handle material. In other embodiments, the implement 120 is a work platform configured to support one or more operators. In some embodiments, the implement 120 is selectively coupled to the fly section 106 such that the implement 120 is interchangeable with other implements. By way of example, the forks shown in FIGS. 1 and 2 may be removed and exchanged with a bucket or work platform.

Referring to FIG. 1, the boom assembly 100 is articulated by a series of actuators. In some embodiments, the actuators are powered by pressurized hydraulic fluid (e.g., from the hydraulic system 200 as controlled by the controller 410). The telehandler 10 includes a pair of first linear actuators (e.g., hydraulic cylinders), shown as lift cylinders 130. A lower end of each lift cylinder 130 is coupled to the frame 12, and an upper end of each lift cylinder 130 is coupled to the base section 102. The lift cylinders 130 are positioned on opposing sides of the boom assembly 100 to facilitate an even distribution of the load of the boom assembly 100. When the lift cylinders 130 extend, the boom assembly 100 is raised. When the lift cylinders 130 retract, the boom assembly 100 is lowered. Accordingly, the lift cylinders 130 raise and lower the implement 120 relative to the frame 12.

The telehandler 10 further includes a second linear actuator (e.g., a hydraulic cylinder), shown as telescoping cylinder 140. A proximal end of the telescoping cylinder 140 is coupled to the base section 102, and a distal end of the telescoping cylinder 140 is coupled to the middle section 104. When the telescoping cylinder 140 is extended, the middle section 104 moves longitudinally outward from the base section 102. When the telescoping cylinder 140 is retracted, the middle section 104 moves back into the base section 102. A tensile member (e.g., a rope, a strap, a chain, etc.), shown as cable 142, includes a first end coupled to the base section 102 and a second end that is coupled to the fly section 106. The cable 142 extends from the base section 102, around a distal end of the middle section 104, and attaches to a portion of the fly section 106 that is received within the middle section 104. Accordingly, when the telescoping cylinder 140 extends, moving the middle section 104 outward, the middle section 104 applies a tensile force to the cable 142, which draws the fly section 106 out of the middle section 104. A similar cable arrangement may be utilized to retract the fly section 106 into the middle section 104 when the middle section 104 retracts into the base section 102. Accordingly, the extension of the telescoping cylinder 140 both (a) extends the middle section 104 relative to the base section 102 and (b) extends the fly section 106 relative to the middle section 104. Similarly, the retraction of the telescoping cylinder 140 both (a) retracts the middle section 104 relative to the base section 102 and (b) retracts the fly section 106 relative to the middle section 104. Accordingly, the telescoping cylinder 140 extends and retracts the implement 120 relative to the frame 12.

The telehandler 10 further includes a third linear actuator (e.g., a hydraulic cylinder), shown as tilt cylinder 150. A proximal end of the tilt cylinder 150 is coupled to the fly section 106, and a distal end of the tilt cylinder 150 is coupled to the implement 120. When the tilt cylinder 150 is retracted, the implement 120 rotates in a first direction (e.g., downward) relative to the fly section 106. When the tilt cylinder 150 is extended, the implement 120 rotates in a second direction (e.g., upward) relative to the fly section 106. Accordingly, the tilt cylinder 150 rotates the implement 120 relative to the frame 12.

The telehandler 10 further includes a pair of hydraulic cylinders, shown as compensating cylinders 160. A lower end of each compensating cylinder 160 is coupled to the frame 12, and an upper end of each compensating cylinder 160 is coupled to the base section 102. The compensating cylinders 160 are positioned on opposing sides of the boom assembly 100 to facilitate an even distribution of the load on the boom assembly 100. When the lift cylinders 130 extend, the boom assembly 100 is raised, forcing the compensating cylinders 160 to extend. This causes the compensating cylinders 160 to expel hydraulic fluid from a first chamber (e.g., a rod end chamber) and draw hydraulic fluid into a second chamber (e.g., a cap end). When the lift cylinders 130 retract, the boom assembly 100 is lowered, forcing the compensating cylinders 160 to retract. This causes the compensating cylinders 160 to expel hydraulic fluid from the second chamber and draw hydraulic fluid into the first chamber. The compensating cylinders 160 are fluidly coupled to the tilt cylinder 150 such that as the boom assembly 100 rises, the fluid from the compensating cylinders 160 is provided to the tilt cylinder 150, causing the tilt cylinder 150 to rotate downwards. Similarly, as the boom assembly 100 is lowered, the fluid from the compensating cylinders 160 is provided to the tilt cylinder 150, causing the tilt cylinder 150 to rotate upwards. This action causes the implement 120 to passively (e.g., without active intervention from the main control valve 290 or the controller 410) maintain a consistent orientation relative to the frame 12 (e.g., and thereby relative to the ground and the direction of gravity).

Hydraulic System

Figure 3:
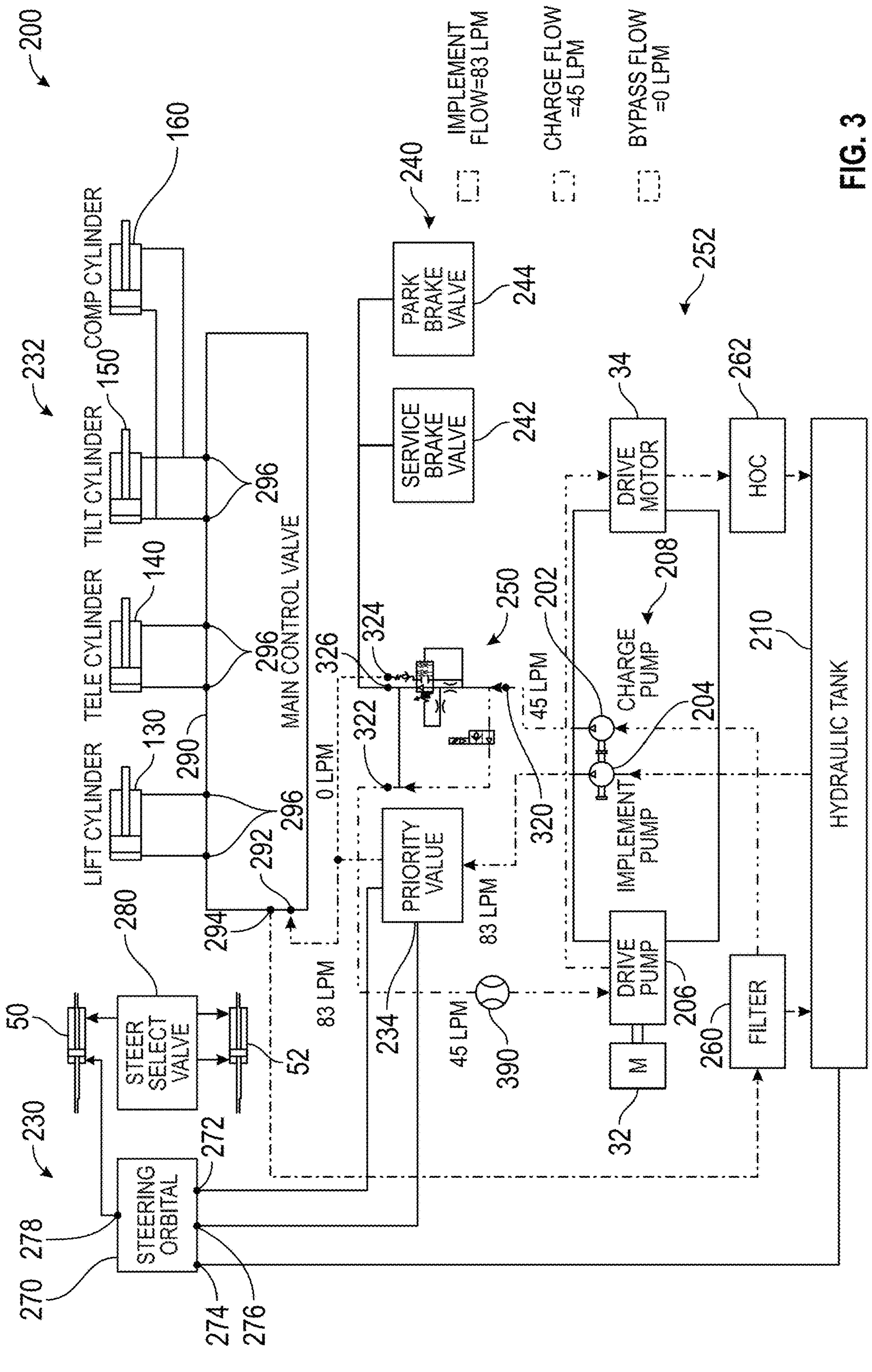
FIG. 3 is a schematic of a hydraulic system of the telehandler of FIG. 1 in a first configuration.
Figure 4:
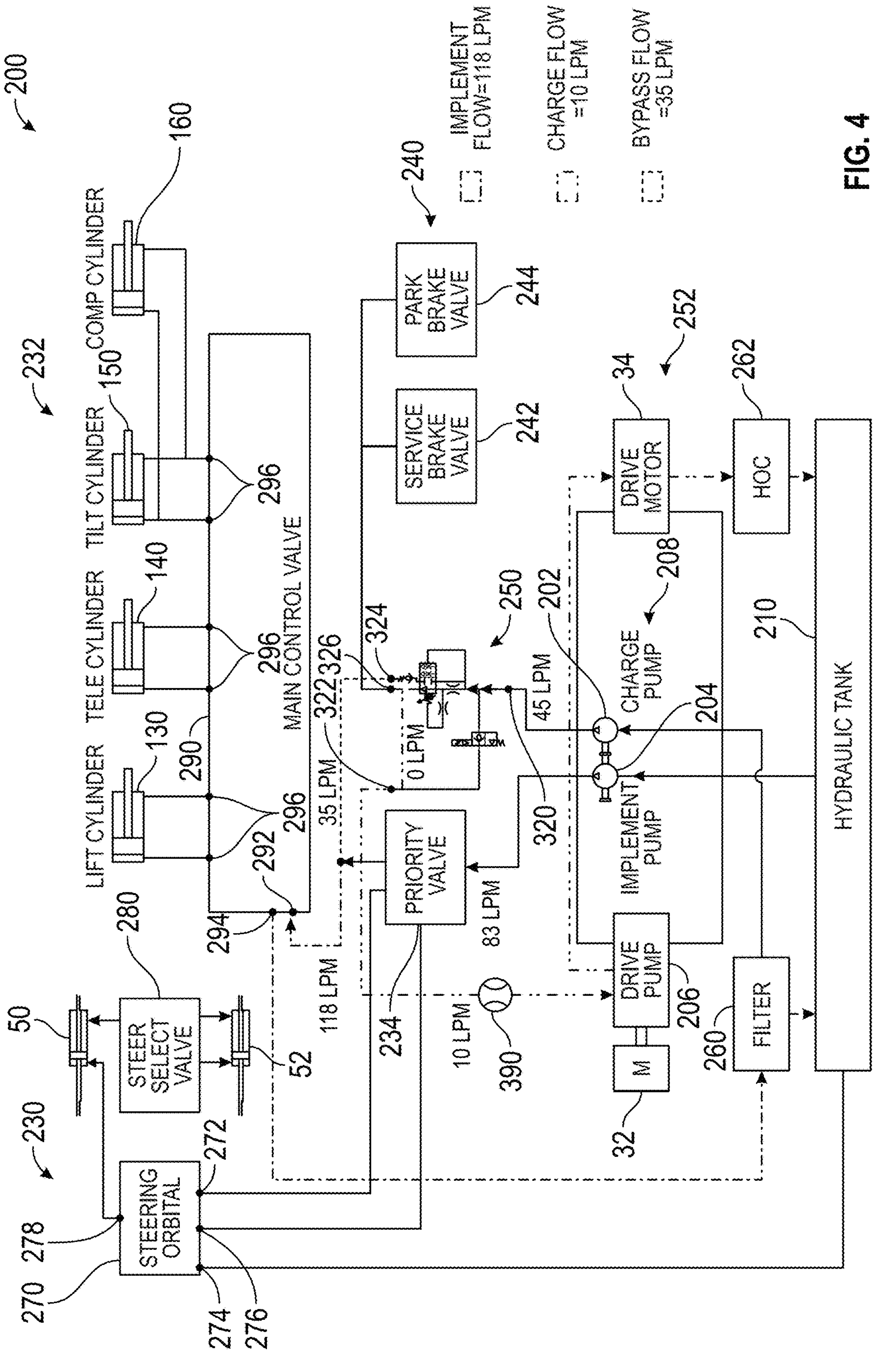
FIG. 4 is a schematic of the hydraulic system of FIG. 3 in a second configuration.

Referring to FIGS. 3 and 4, the telehandler 10 includes a fluid power system, shown as hydraulic system 200. The hydraulic system 200 is configured to supply pressurized hydraulic fluid to power (e.g., drive) the various actuators of the telehandler 10. The hydraulic system 200 includes fluid power sources (e.g., a first pump, a second pump, and a third pump, etc.), shown as charge pump 202, implement pump 204, and drive pump 206. The charge pump 202, the implement pump 204, and the drive pump 206 are configured to receive mechanical energy (e.g., rotational mechanical energy) and provide fluid power (e.g., a flow of pressurized hydraulic fluid, such as hydraulic oil) to power various actuators throughout the hydraulic system 200. As shown, the charge pump 202, the implement pump 204, and the drive pump 206 are all coupled to an output of the primary driver 32 such that they are driven by the primary driver 32. As shown, the charge pump 202 and the implement pump 204 are coupled to one another, forming a tandem pump assembly 208. The charge pump 202 and the implement pump 204 may be coupled to one another such that the charge pump 202 and the implement pump 204 are driven at the same speed. The tandem pump assembly 208 is coupled to the primary driver 32 through the drive pump 206. In some embodiments, the tandem pump assembly 208 and the drive pump 206 also operate at the same speed. In other embodiments, the charge pump 202, the implement pump 204, and/or the drive pump 206 are driven by another driver (e.g., an electric motor).

The charge pump 202 and the implement pump 204 each include an inlet that is fluidly coupled to a source of hydraulic fluid, shown as hydraulic tank 210. The hydraulic tank 210 may provide hydraulic fluid to the inlets of the charge pump 202 and the implement pump 204 at a relatively low pressure (e.g., atmospheric pressure). The charge pump 202 and the implement pump 204 may provide a flow of pressurized fluid (e.g., from a corresponding outlet) at a relatively high pressure.

The implement pump 204 is configured to provide pressurized hydraulic fluid to power various actuators of the telehandler 10. As shown in FIGS. 3 and 4, the implement pump 204 is configured to provide pressurized hydraulic fluid to at least one of (e.g., one or both of) (a) a steering control assembly 230 including the front steering cylinder 50 and the rear steering cylinder 52 or (b) a boom control assembly 232 including the lift cylinder 130, the telescoping cylinder 140, the tilt cylinder 150, and the compensating cylinder 160. Specifically, the implement pump 204 is configured to provide pressurized hydraulic fluid to at least one of the steering control assembly 230 or the boom control assembly 232 through a valve assembly, shown as priority valve 234. The priority valve 234 is positioned between and fluidly coupled to (a) the steering control assembly 230 and the boom control assembly 232 and (b) the implement pump 204. During operation, fluid passes out of the implement pump 204, is directed by the priority valve 234 to either the steering control assembly 230 or the boom control assembly 232, and returns from the steering control assembly 230 or the boom control assembly 232 to the hydraulic tank 210.

The charge pump 202 is configured to provide pressurized hydraulic fluid to power various actuators of the telehandler 10. As shown in FIG. 3, the charge pump 202 is configured to provide pressurized hydraulic fluid to at least one of (a) the drive pump 206, (b) the boom control assembly 232, or (c) a brake control assembly 240 including a first brake actuator, shown as service brake valve 242, and a second brake actuator, shown as park brake valve 244. Specifically, the implement pump 204 is configured to provide pressurized hydraulic fluid to at least one of (a) the drive pump 206, (b) the boom control assembly 232, or (c) the brake control assembly 240 through a valve assembly, shown as charge flow diverter valve assembly 250. The charge flow diverter valve assembly 250 is positioned between and fluidly coupled to the (a) the drive pump 206, the boom control assembly 232, and the brake control assembly 240 and (b) the charge pump 202. During operation, fluid passes out of the charge pump 202, is directed by the charge flow diverter valve assembly 250 to either the drive pump 206, the boom control assembly 232, or the brake control assembly 240, and returns from the drive pump 206, the boom control assembly 232, or the brake control assembly 240 to the hydraulic tank 210. As shown, the charge pump 202 may receive fluid from the hydraulic tank 210 or from an outlet of the boom control assembly 232.

The drive pump 206 is configured to provide pressurized hydraulic fluid to power one or more of the hydraulic drive motors 34. Specifically, FIGS. 3 and 4 show an outlet of the drive pump 206 being fluidly coupled to one drive motor 34. The drive pump 206 and the drive motor 34 together form a hydrostatic power transmission, shown as hydrostatic transmission 252, in which fluid from the drive pump 206 powers the drive motor 34 to drive the corresponding tractive element(s) 30. Fluid may recirculate within the hydrostatic transmission 252 between the drive pump 206 and the drive motor 34 and may be supplemented by a charge flow of fluid from the charge pump 202. The charge pump 202 and the charge flow diverter valve assembly 250 may supply fluid directly to the charge pump 202, or to another portion of the hydrostatic transmission 252 that feeds fluid to the drive pump 206. In some embodiments, the drive pump 206 is a variable displacement pump having a variable output flow rate for a given speed of the rotational mechanical energy input from the primary driver 32 (e.g., controlled by varying the orientation of a swash plate within the drive pump 206). Additionally or alternatively, the drive motor 34 may be a variable displacement motor that is configured to vary the speed and/or direction of the rotational mechanical energy output provided by the drive motor 34 for a flow rate of the fluid received by the drive motor 34 (e.g., by varying the orientation of a swash plate within the drive motor 34). Although only one drive motor 34 is shown in FIGS. 3 and 4, it should be understood that the drive pump 206 may provide pressurized hydraulic fluid to power to multiple drive motors 34 (e.g., one for each tractive element 30). In other embodiments, the hydraulic system 200 includes multiple drive pumps 206.

In operation, the drive pump 206 receives charge fluid from the charge pump 202 through the charge flow diverter valve assembly 250. The drive pump 206 receives rotational mechanical energy from the primary driver 32 and pressurizes fluid within the hydrostatic transmission 252. This high pressure fluid drives the drive motor 34, which outputs rotational mechanical energy to one or more of the tractive elements 30. The fluid then leaves the drive motor 34 at a reduced pressure and returns to the hydraulic tank 210.

Referring still to FIGS. 3 and 4, the hydraulic system 200 may include various systems for cleaning (e.g., filtering, treating, etc.) the hydraulic fluid. As shown, the hydraulic system 200 includes a first filter or cleaner, shown as filter 260, and a second filter or cleaner shown as hydraulic oil cleaner (HOC) 262. The filter 260 and the HOC 262 may include various filtration elements or separators that remove contaminants (e.g., water, dirt, sludge, carbon, air, etc.) from the hydraulic fluid. As shown, the filter 260 is positioned between an outlet of the boom control assembly 232, an inlet of the charge pump 202, and the hydraulic tank 210. Accordingly, fluid may flow through the filter 260 between any two of the boom control assembly 232, the charge pump 202, and the hydraulic tank 210. As shown, the HOC 262 is positioned between an outlet of the hydrostatic transmission 252 (specifically, an outlet of the drive motor 34) and the hydraulic tank 210. Accordingly, fluid may flow through the HOC 262 from the drive motor 34 to the hydraulic tank 210. In other embodiments, the filter 260 and/or the HOC 262 are positioned elsewhere throughout the hydraulic system 200.

The steering control assembly 230 includes a first control valve (e.g., a steering orbital valve, etc.), shown as steering orbital 270. In some embodiments, the steering orbital 270 is configured to receive a user input (e.g., a rotational position of a steering wheel, rotation of a steering wheel, etc.) and provide output flows based on the user input. As shown, the steering orbital 270 defines a first inlet and/or outlet, shown as inlet port 272, a second inlet and/or outlet, shown as drain port 274, a third inlet and/or outlet, shown as sensing port 276, and a fourth inlet and/or outlet, shown as actuator port 278. The inlet port 272 is fluidly coupled to the priority valve 234 and receives a portion of the fluid supplied by the implement pump 204 to the priority valve 234. The drain port 274 is fluidly coupled to the hydraulic tank 210 and returns fluid to the hydraulic tank 210 at a low pressure. The sensing port 276 supplies fluid to and/or receives fluid from the priority valve 234. This fluid may be used by the priority valve 234 and/or the steering orbital 270 to control the actuation of the priority valve 234 and/or the steering orbital 270. By way of example, the pressure, flow direction, and/or flow rate of the fluid within the passage connected to the sensing port 276 may be utilized to control actuation of the priority valve 234 and/or the steering orbital 270.

As shown in FIGS. 3 and 4, the actuator port 278 is fluidly coupled to a first chamber of the front steering cylinder 50. A second chamber of the front steering cylinder 50 is fluidly coupled to a steering control subassembly, shown as steer select valve 280. When the steering orbital 270 provides fluid to the first chamber of the front steering cylinder 50, the front steering cylinder 50 moves in a first direction. When the steering orbital 270 permits fluid to leave the first chamber of the front steering cylinder 50, the front steering cylinder 50 moves in a second direction opposite direction. The steer select valve 280 may provide back pressure to the second chamber of the front steering cylinder 50 to facilitate movement of the front steering cylinder 50 in the second direction. By way of example, the steer select valve 280 may be fluidly coupled to or include an accumulator that at least selectively (e.g., selectively or constantly) supplies pressurized fluid to the second chamber of the front steering cylinder 50 to move the front steering cylinder 50 in the second direction.

The steer select valve 280 may be configured to control actuation of the rear steering cylinder 52. The steer select valve 280 is fluidly coupled to a first chamber and a second chamber of the rear steering cylinder 52. The steer select valve 280 may supply fluid to and/or remove fluid from the first chamber and the second chamber to control the position of the rear steering cylinder 52. In some embodiments, the steer select valve 280 is configured to operate in various steering modes (e.g., modes of operation). In a first mode of operation, the steer select valve 280 holds the rear steering cylinder 52 in a position (e.g., a center position) corresponding to a straight orientation of the rearmost tractive elements 30. In a second mode of operation, the steer select valve 280 controls the rear steering cylinder 52 to rotate the rearmost tractive elements 30 in a direction opposite the frontmost tractive elements 30. The second mode of operation may facilitate the telehandler 10 steering with a smaller turning radius than the first mode of operation. In a third mode of operation, the steer select valve 280 controls the rear steering cylinder 52 to rotate the rearmost tractive elements 30 in the same direction as the frontmost tractive elements 30 to facilitate translation of the telehandler 10 without rotating the telehandler 10.

Referring still to FIGS. 3 and 4, the boom control assembly 232 includes a directional control valve assembly, shown as main control valve 290. The main control valve 290 defines a first inlet and/or outlet, shown as inlet port 292, a second inlet and/or outlet, shown as drain port 294, and a series of third inlets and/or outlets, shown as actuator ports 296. The inlet port 292 is fluidly coupled to the priority valve 234 and the charge flow diverter valve assembly 250 and configured to receive fluid flow from the priority valve 234 and/or the charge flow diverter valve assembly 250. The drain port 294 is fluidly coupled to the filter 260. The drain port 294 returns fluid at a low pressure to the hydraulic tank 210 and/or the charge pump 202 through the filter 260. The actuator ports 296 are each fluidly coupled to a chamber of (a) the lift cylinder 130, (b) the telescoping cylinder 140, or (c) the tilt cylinder 150. In other embodiments of lift devices that include different boom configurations, the main control valve 290 may include actuator ports 296 that are fluidly coupled to additional or alternative cylinders (e.g., a hydraulic cylinder coupled to the implement 120, the levelling cylinders 42, etc.).

The main control valve 290 may be an assembly that includes a series of directional control valves, each fluidly coupled to the inlet port 292, the drain port 294, and a pair of actuator ports 296 coupled to one or more of the actuators (e.g., the lift cylinders 130, the telescoping cylinder 140, the tilt cylinder 150, etc.). Each directional control valve is configured to selectively fluidly couple the inlet port 292 to one chamber of an actuator and the drain port 294 to the other chamber of the actuator. Accordingly, the main control valve 290 is configured to control fluid flow into and out of the actuators to control movement of each actuator. The main control valve 290 may control the flow direction of fluid (corresponding to whether the actuator is extending or retracting) and the flow rate (corresponding to the speed at which the actuator extends or retracts). Accordingly, the main control valve 290 may control the motion (e.g., speed and direction) of each actuator independently.

Figure 5:
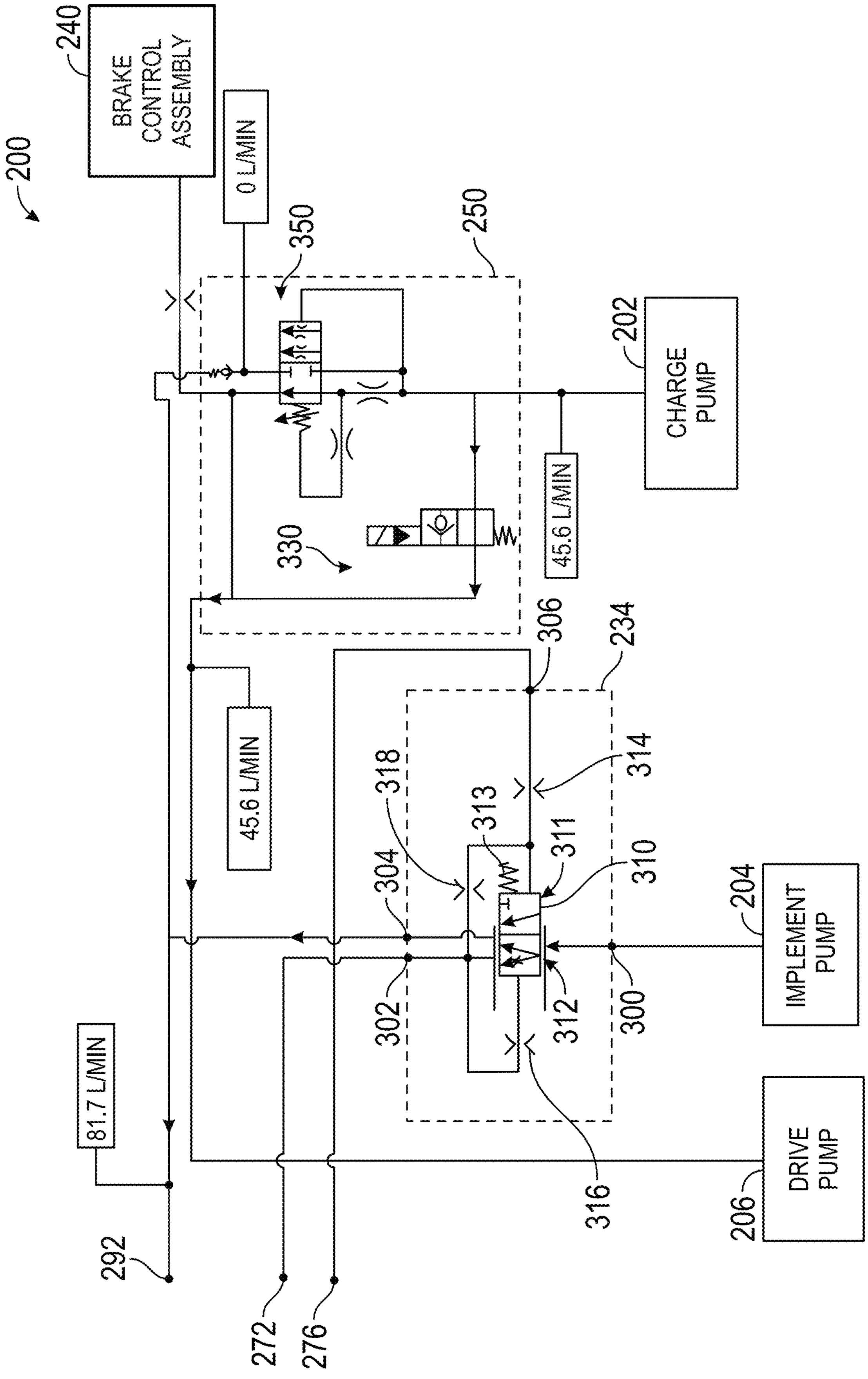
FIG. 5 is a schematic of the hydraulic system of FIG. 3 in the first configuration.
Figure 6:
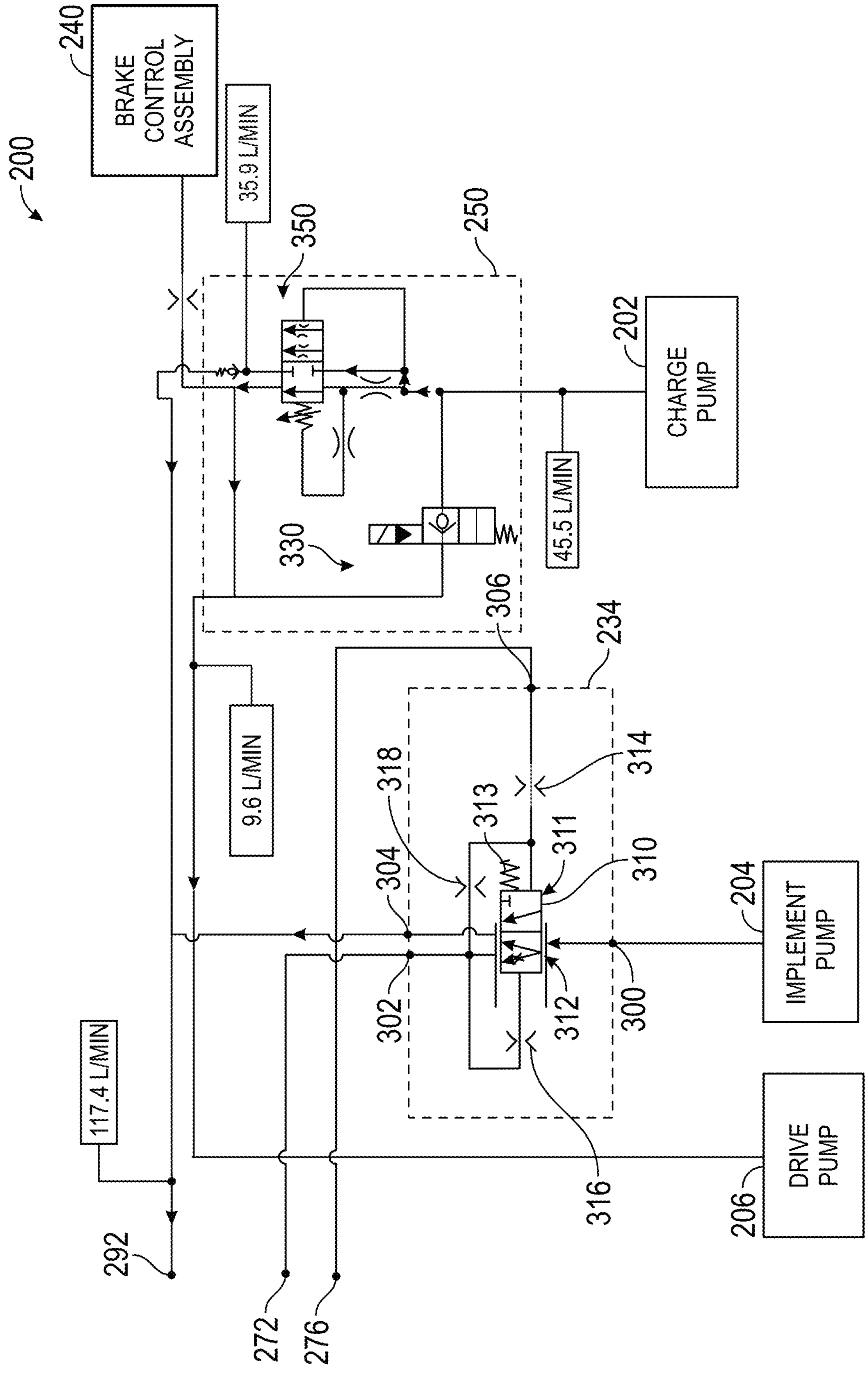
FIG. 6 is a schematic of the hydraulic system of FIG. 3 in the second configuration.

Referring to FIGS. 5 and 6, the priority valve 234 is shown according to an exemplary embodiment. The priority valve 234 defines a first inlet and/or outlet, shown as inlet port 300, a second inlet and/or outlet, shown as steering outlet port 302, a third inlet and/or outlet, shown as boom outlet port 304, and a fourth inlet and/or outlet, shown as sensing port 306. The inlet port 300 is fluidly coupled to the outlet of the implement pump 204. The steering outlet port 302 is fluidly coupled to the inlet port 272 of the steering orbital 270. The boom outlet port 304 is fluidly coupled to the inlet port 292 of the main control valve 290. The sensing port 306 is fluidly coupled to the sensing port 276 of the steering orbital 270.

As shown in FIGS. 5 and 6, the priority valve 234 is a proportional directional control valve including a flow control element or spool, shown as valve element 310. The valve element 310 is continuously repositionable between a first position, blocking position, or steering priority position, represented by the right half of the valve element 310, and a second position, diverting position, or boom priority position, represented by the left half of the valve element 310. In the steering priority position, the valve element 310 (a) provides unrestricted flow from the inlet port 300 to the steering outlet port 302 and (b) fluidly decouples the inlet port 300 from the boom outlet port 304. Accordingly, in the steering priority position (e.g., in a first configuration), the valve element 310 directs all of the flow from the implement pump 204 to the steering control assembly 230. In the boom priority position, the valve element 310 (a) provides restricted flow (e.g., flow through an orifice within the valve element 310) from the inlet port 300 to the steering outlet port 302 and (b) provides unrestricted flow from the inlet port 300 to the boom outlet port 304. Accordingly, in the boom priority position (e.g., in the second configuration), the valve element 310 directs limited flow to the steering control assembly 230 and directs a maximized flow to the boom control assembly 232. The priority valve 234 may be a proportional valve such that the valve element 310 proportionally varies flow between the first configuration and the second configuration based on a location of the valve element 310 between the steering priority position and the boom priority position.

The valve element 310 has a first end 311 and a second end 312. A biasing element (e.g., a compression spring), shown as spring 313, is coupled to the first end 311. The spring 313 applies a biasing force to bias the valve element 310 toward the steering priority position. The first end 311 of the valve element 310 is fluidly coupled to the sensing port 306 through a flow control element, shown as orifice 314. The second end 312 of the valve element 310 is fluidly coupled to the steering outlet port 302 through a flow control element, shown as orifice 316. The first end 311 of the valve element 310 is fluidly coupled to the steering outlet port 302 through an orifice 318. In some embodiments, the orifice 314 and the orifice 318 are larger than the orifice 316 (e.g., 1.2 mm and 0.8 mm, respectively).

In a state with no fluid pressure acting on the priority valve 234, the spring 313 forces the valve element 310 to the steering priority position by default. As the pressure at the steering outlet port 302 increases (e.g., as the fluid demand of the steering control assembly 230 is satisfied), the force on the second end 312 increases, biasing the valve element 310 toward the boom priority position. The pressure at the sensing port 306 acts on the first end 311, forcing the valve element 310 back toward the steering priority position.

Referring to FIGS. 3 and 4, the service brake valve 242 and the park brake valve 244 are configured to control braking of the tractive elements 30. The service brake valve 242 and the park brake valve 244 are fluidly coupled to and receive pressurized fluid from the charge flow diverter valve assembly 250. The service brake valve 242 and the park brake valve 244 are configured to selectively provide this pressurized fluid to one or more brake assemblies coupled to the tractive elements 30. In response to receiving the pressurized fluid from the service brake valve 242 and/or the park brake valve 244, the brake assemblies apply a braking force to oppose movement of the tractive elements 30. In some embodiments, the service brake valve 242 provides the primary braking function that is used during operation of the telehandler 10. By way of example, the service brake valve 242 may activate the brake assemblies in response to a user pressing a brake pedal. The service brake valve 242 may require constant interaction from a user (e.g., continuous depression of the brake pedal) to remain activated. In some embodiments, the park brake valve 244 provides a secondary braking function that is used when the telehandler 10 is parked. By way of example, the park brake valve 244 may activate the brake assemblies in response to a user interacting with a brake lever. The park brake valve 244 may be toggled on or off by a user interaction (e.g., through the brake lever) such that the park brake valve 244 remains activated, even after the user interaction has ended.

Referring to FIGS. 3-8, the charge flow diverter valve assembly 250 is shown according to an exemplary embodiment. The charge flow diverter valve assembly 250 defines a first inlet and/or outlet, shown as inlet port 320, a second inlet and/or outlet, shown as drive outlet port 322, a third inlet and/or outlet, shown as boom outlet port 324, and a fourth inlet and/or outlet, shown as brake outlet port 326. The inlet port 300 is fluidly coupled to the outlet of the charge pump 202. The drive outlet port 322 is fluidly coupled to an inlet of the drive pump 206. The boom outlet port 324 is fluidly coupled to the inlet port 292 of the main control valve 290. The brake outlet port 326 is fluidly coupled to the brake control assembly 240 and directly coupled to the drive outlet port 322. In some embodiments, the brake outlet port 326 and the drive outlet port 322 are combined as a single port.

The charge flow diverter valve assembly 250 is an assembly including a first valve, shown as activator valve 330, and a second valve (e.g., a directional control valve), shown as diverter valve 350. The activator valve 330 includes a flow control element or spool, shown as valve element 332, that is selectively repositionable between a first position, default position, or inactive position, shown in FIG. 7, and a second position or active position, shown in FIG. 8. In the inactive position, the valve element 332 fluidly couples the inlet port 320 to the drive outlet port 322 and the brake outlet port 326. In the active position, a check valve 334 of the valve element 332 is fluidly coupled to the inlet port 320, the drive outlet port 322, and the brake outlet port 326. The check valve 334 fluidly decouples the inlet port 320 from the drive outlet port 322 and the brake outlet port 326 through the activator valve 330. Specifically, the check valve 334 limits (e.g., prevents) flow in a first direction through the activator valve 330 from the inlet port 320 to the drive outlet port 322. The check valve 334 may permit flow in a second direction through the activator valve 330 from the drive outlet port 322 and/or the brake outlet port 326 to the inlet port 320, although this may not be the primary flow direction during normal operation of the telehandler 10. In other embodiments, the check valve 334 is omitted, and the valve element 332 limits (e.g., prevents) flow through the activator valve 330 in both directions when the valve element 332 is in the second position.

The activator valve 330 includes a biasing element (e.g., a compression spring), shown as spring 336, that is coupled to the valve element 332. The spring 336 biases the valve element 332 toward the inactive position. The activator valve 330 further includes a valve actuator (e.g., an electric actuator, a pneumatic actuator, a hydraulic actuator, etc.), shown as solenoid 338, that is coupled to the valve element 332. When activated, the solenoid 338 forces the valve element 332 to the active position. When the solenoid is deactivated, the spring 336 returns the valve element 332 to the inactive position.

Figure 8:
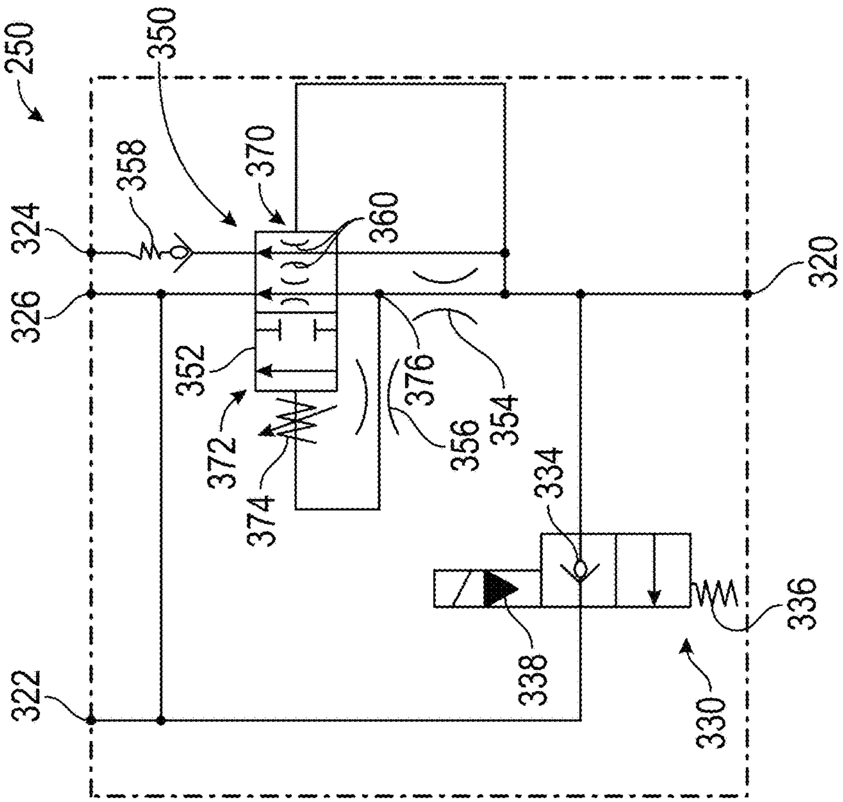
FIG. 8 is a schematic of the charge flow diverter valve assembly of the hydraulic system of FIG. 3 in the second configuration.
Figure 7:
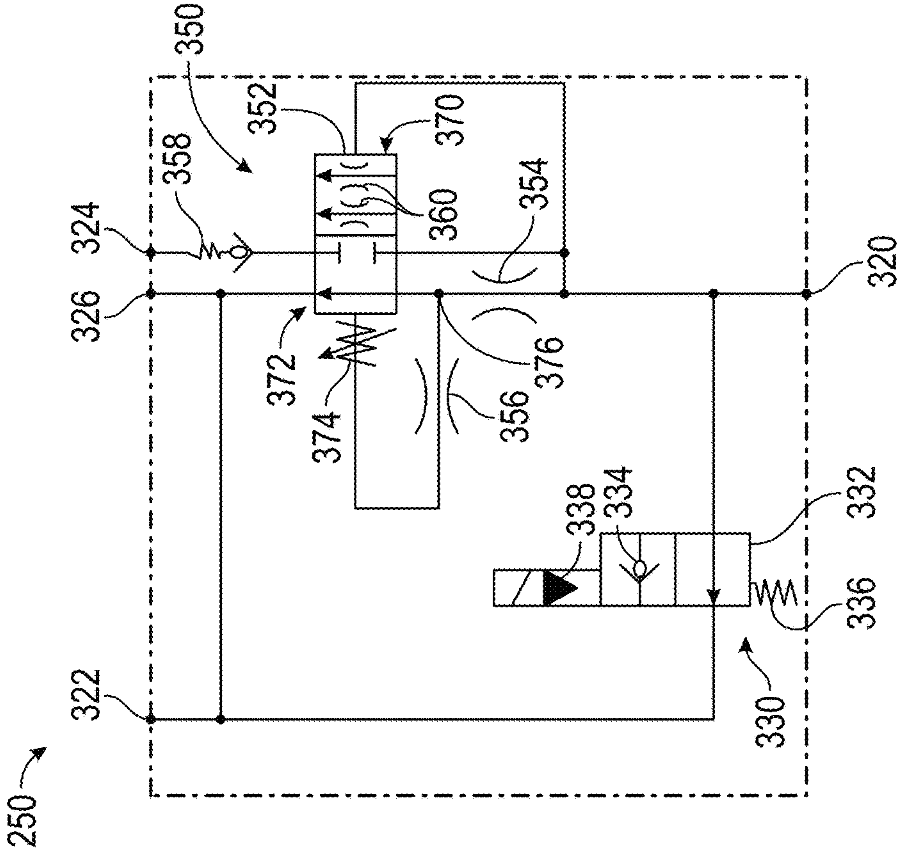
FIG. 7 is a schematic of a charge flow diverter valve assembly of the hydraulic system of FIG. 3 in the first configuration.

The diverter valve 350 includes a flow control element or spool, shown as valve element 352, that is selectively repositionable between a first position, default position, or blocking position, shown in FIG. 7, and a second position, active position, or diverting position, shown in FIG. 8. In some embodiments, the diverter valve 350 is a proportional directional control valve such that the valve element 352 is continuously repositionable between the blocking position and the diverting position. In other embodiments, the valve element 352 is a discretely repositionable two position valve such that diverter valve 350 is operable only with the valve element 352 in the blocking position or the diverting position. The diverter valve 350 further includes a pair of flow control elements, shown as orifice 354 and orifice 356, that limit (e.g., restrict) flow therethrough. A check valve 358 is fluidly coupled to boom outlet port 324 and the valve element 352. The check valve 358 is positioned downstream of the valve element 352. The check valve 358 (a) prevents flow from the boom outlet port 324 toward the valve element 352 and (b) permits free flow from the valve element 352 toward the boom outlet port 324.

With the valve element 352 in the blocking position (shown in FIG. 7), the valve element 352 both (a) fluidly decouples the inlet port 320 from the boom outlet port 324 and (b) fluidly couples the inlet port 320 to the drive outlet port 322 and the brake outlet port 326 through the orifice 354. With the valve element 352 in the diverting position, the valve element 352 both (a) fluidly couples the inlet port 320 to the boom outlet port 324 through the check valve 358 and (b) fluidly couples the inlet port 320 to the drive outlet port 322 and the brake outlet port 326 through the orifice 354. The valve element 352 includes a pair of flow control elements, shown as orifices 360, that limit (e.g., restrict) the flow through the valve element 352 when the valve element 352 is in the diverting position.

The valve element 352 includes a first end 370 and a second end 372. The first end 370 is directly fluidly coupled to the inlet port 320. Accordingly, the pressure of the fluid at the inlet port 320 applies a biasing force on the first end 370, biasing the valve element 352 toward the diverting position. The diverter valve 350 further includes a biasing element (e.g., a compression spring), shown as spring 374, coupled to the second end 372. The spring 374 applies a biasing force on the second end 372 that biases the valve element 352 towards the blocking position. In some embodiments, the spring 374 provides a variable force (e.g., that is calibrated and set during installation of the diverter valve 350 within the hydraulic system 200). The second end 372 is fluidly coupled to a location, shown as point 376, through the orifice 356. The point 376 is positioned directly between the orifice 354 and the valve element 352. Accordingly, the pressure of the fluid directly upstream of the valve element 352 applies a biasing force on the second end 372, biasing the valve element 352 toward the blocking position. When the hydraulic system 200 is depressurized, the forces exerted on the valve element 352 by the pressures may be negligible such that the spring 374 returns the valve element 352 to the blocking position by default.

During operation, the charge flow diverter valve assembly 250 is operable in either a first, standard, default, deactivated, or deenergized configuration, in which the solenoid 338 of the activator valve 330 is not activated, and an activated or energized configuration, in which the solenoid 338 of the activator valve 330 is activated. The deenergized configuration is shown in FIGS. 3, 5, and 7. The energized configuration is shown in FIGS. 4, 6, and 8. In the deenergized configuration, the charge flow diverter valve assembly 250 maximizes the amount of fluid supplied from the charge pump 202 to the drive pump 206. This mode of operation may facilitate high travel speeds of the telehandler 10 (e.g., by increasing the maximum speed of the drive motor 34). In the energized configuration, the charge flow diverter valve assembly 250 directs a portion of the flow from the charge pump 202 to the boom control assembly 232. This may facilitate high movement speed (e.g., extension speed, lift speed, etc.) of the boom assembly 100.

Referring to FIGS. 3, 5, and 7, in the deenergized configuration, the activator valve 330 is deenergized such that the valve element 332 is in the inactive position. Accordingly, the activator valve 330 fluidly couples the charge pump 202 to the brake control assembly 240 and the drive pump 206 (e.g., through the inlet port 320, the valve element 332, the drive outlet port 322, and the brake outlet port 326). With fluid flowing freely through the activator valve 330, the pressure upstream of the diverter valve 350 is relatively low. The force of the pressure on the first end 370 of the valve element 352 may be lower than the force exerted on the second end 372 by the spring 374. Accordingly, the spring 374 forces the valve element 352 to the blocking position. In the blocking position, the diverter valve 350 fluidly couples the charge pump 202 to the brake control assembly 240 and the drive pump 206 (e.g., through the inlet port 320, the orifice 354, the valve element 352, the drive outlet port 322, and the brake outlet port 326). In the blocking position, the valve element 352 fluidly decouples the inlet port 320 from the boom outlet port 324.

In the deenergized configuration, the charge flow diverter valve assembly 250 directs all of the fluid from the charge pump 202 to the drive pump 206 and/or the brake control assembly 240. All of the fluid that is received by the boom control assembly 232 is supplied by the implement pump 204. In the embodiment of the deenergized configuration shown in FIG. 3, the charge pump 202 outputs 45 liters per minute (LPM) of fluid flow. The charge flow diverter valve assembly 250 directs all 45 LPM of flow to the drive pump 206 and the hydrostatic transmission 252. In other situations, a portion of the fluid exiting the charge flow diverter valve assembly 250 is received by the brake control assembly 240. In the embodiment of the deenergized configuration shown in FIG. 3, the implement pump 204 supplies 83 LPM of fluid to the priority valve 234. The priority valve 234 directs all 83 LPM of flow to the boom control assembly 232. In other situations, the priority valve 234 may supply a portion of the fluid from the implement pump 204 to the steering control assembly 230.

Referring to FIGS. 4, 6, and 8, in the energized configuration, the activator valve 330 is energized such that the valve element 332 is in the active position. Accordingly, the activator valve 330 fluidly decouples the charge pump 202 from the brake control assembly 240 and the drive pump 206 (e.g., by interrupting the path through the valve element 332 from the inlet port 320 to the drive outlet port 322 and the brake outlet port 326). With the flow of fluid through the activator valve 330 interrupted, pressure upstream of the diverter valve 350 (e.g., at the inlet port 320) increases. The first end 370 of the valve element 352 experiences the force of the full pressure at the inlet port 320. The second end 372 of the valve element 352 experiences both (a) the force of the spring 374 and (b) the force of the pressure at the inlet port 320 as reduced by the orifice 354 and the orifice 356. Accordingly, as the pressure at the inlet port 320 increases, the force on the first end 370 begins to overcome the force at the second end 372, and the valve element 352 moves toward the diverting position. In the diverting position, the diverter valve 350 both (a) fluidly couples the charge pump 202 to the brake control assembly 240 and the drive pump 206 (e.g., through the inlet port 320, the orifice 354, the valve element 352 including the orifice 360, the drive outlet port 322, and the brake outlet port 326) and (b) fluidly couples the charge pump 202 to the boom control assembly 232 (e.g., through the inlet port 320, the valve element 352 including the orifice 360, the check valve 358, and the boom outlet port 324). Accordingly, a first portion of the fluid from the charge pump 202 is directed to the drive pump 206, and a second portion of the fluid from the charge pump 202 is directed to the boom control assembly 232.

If the diverter valve 350 is a proportional valve, the flow through the valve element 352 may change gradually based on the position of the valve element 352. As the valve element 352 moves closer to the diverting position, a greater portion of the flow is directed to the boom outlet port 324. By way of example, when the pressure at the inlet port 320 is a first pressure, the valve element 352 may be at a first position in which fluid is directed to both (a) the drive outlet port 322 and the brake outlet port 326 and (b) the boom outlet port 324. When the pressure at the inlet port 320 is a second pressure greater than the first pressure, the valve element 352 may be in a second position closer to the full diverting position. In this second position, the amount of fluid directed to the drive outlet port 322 and the brake outlet port 326 may decrease, and the amount of fluid directed to the boom outlet port 324 may increase, relative to the first position. In other embodiments, the diverter valve 350 is a two position valve that is operable only in the blocking position or the diverting position.

In some embodiments, the drive pump 206 benefits from being supplied with a threshold minimum flow rate of fluid (e.g., 9.6 LPM, 10 LPM, etc.) throughout operation of the telehandler 10. By way of example, this minimum flow rate may be predetermined and specified by the manufacturer of the drive pump 206. In the deenergized configuration, the charge flow diverter valve assembly 250 directs all of the fluid from the charge pump 202 toward the drive pump 206, except for a relatively small portion of the flow that may be directed to the brake control assembly 240. Accordingly, the charge flow diverter valve assembly 250 meets the minimum flow rate requirement in the deenergized configuration.

In the energized configuration of the charge flow diverter valve assembly 250, the diverter valve 350 directs a portion of the fluid from the charge pump 202 toward the boom control assembly 232. The diverter valve 350 is configured to control the valve element 352 to vary the amount of fluid that is directed away from the drive pump 206 and toward the boom control assembly 232 in order to meet the minimum flow rate requirement in the energized configuration. By way of example, the diverter valve 350 may only supply fluid to the boom control assembly 232 when the minimum flow requirement of the drive pump 206 is satisfied.

The orifice 354 is positioned between the inlet port 320 and the valve element 352, such that the fluid pressure acting on the first end 370 of the valve element 352 is supplied from upstream of the orifice 354. The orifice 354 and the spring 374 may be sized to balance the forces on the valve element 352 such that the diverter valve 350 supplies at least the minimum flow rate to the drive pump 206. By way of example, the orifice 354 may be sized such that, when the flow through the orifice 354 (and thus the charge flow supplied to the drive pump 206) is near or below the minimum flow rate, the pressure upstream of the orifice 354 is relatively low. Accordingly, the force on the first end 370 is relatively low, and the force of the spring 374 forces the valve element 352 to remain proximate (e.g., in, nearby, etc.) the blocking position, such that most or all of the flow from the charge pump 202 is directed toward the drive pump 206. As the amount of flow from the charge pump 202 increases, the restriction of the orifice 354 causes the pressure upstream of the orifice 354 to increase. This increases the force of the pressure acting on the first end 370, overcoming the biasing force of the spring 374 and moving the valve element 352 toward the diverting position. This balance continues to adjust the position of the valve element 352 as the flow rate provided by the charge pump 202 varies throughout operation, ensuring that the minimum flow requirements of the drive pump 206 arc met while permitting any excess flow to be diverted to the boom control assembly 232 to increase the speed of the boom assembly 100.

In the embodiment of the energized configuration shown in FIG. 4, the charge pump 202 outputs 45 liters per minute (LPM) of fluid flow. The charge flow diverter valve assembly 250 directs 10 LPM of the flow to the drive pump 206, satisfying the minimum flow rate requirement. The highly pressurized fluid is then supplied to the drive motor 34. In other situations, a portion of the fluid exiting the charge flow diverter valve assembly 250 is received by the brake control assembly 240. The charge flow diverter valve assembly 250 directs the remaining 35 LPM of the flow from the charge pump 202 to the boom control assembly 232. In the embodiment of the energized configuration shown in FIG. 4, the implement pump 204 supplies 83 LPM of fluid to the priority valve 234. The priority valve 234 directs all 83 LPM of flow to the boom control assembly 232. The 35 LPM of fluid from the charge pump 202 and the 83 LPM of fluid from the implement pump 204 combine, providing a total of 118 LPM to the boom control assembly 232. In other situations, the priority valve 234 may supply a portion of the fluid from the implement pump 204 to the steering control assembly 230.

Referring to FIGS. 3 and 4, the hydraulic system may additionally or alternatively include a flow speed sensor, shown as flow meter 390. The flow meter 390 is positioned between the drive outlet port 322 of the charge flow diverter valve assembly 250 and the drive pump 206. The flow meter 390 is configured to measure the flow rate of the charge flow supplied by the charge pump 202 and the charge flow diverter valve assembly 250 to the drive pump 206. In some embodiments, the measurement of the flow meter 390 is monitored (e.g., by the controller 410). In some embodiment, the solenoid 338 is deactivated (e.g., by the controller 410) to return the charge flow diverter valve assembly 250 to the deenergized configuration in response to the measurement of the flow meter 390 falling below the minimum flow rate required by the drive pump 206. In other embodiments, the flow meter 390 is omitted.

Control System

Figure 9:
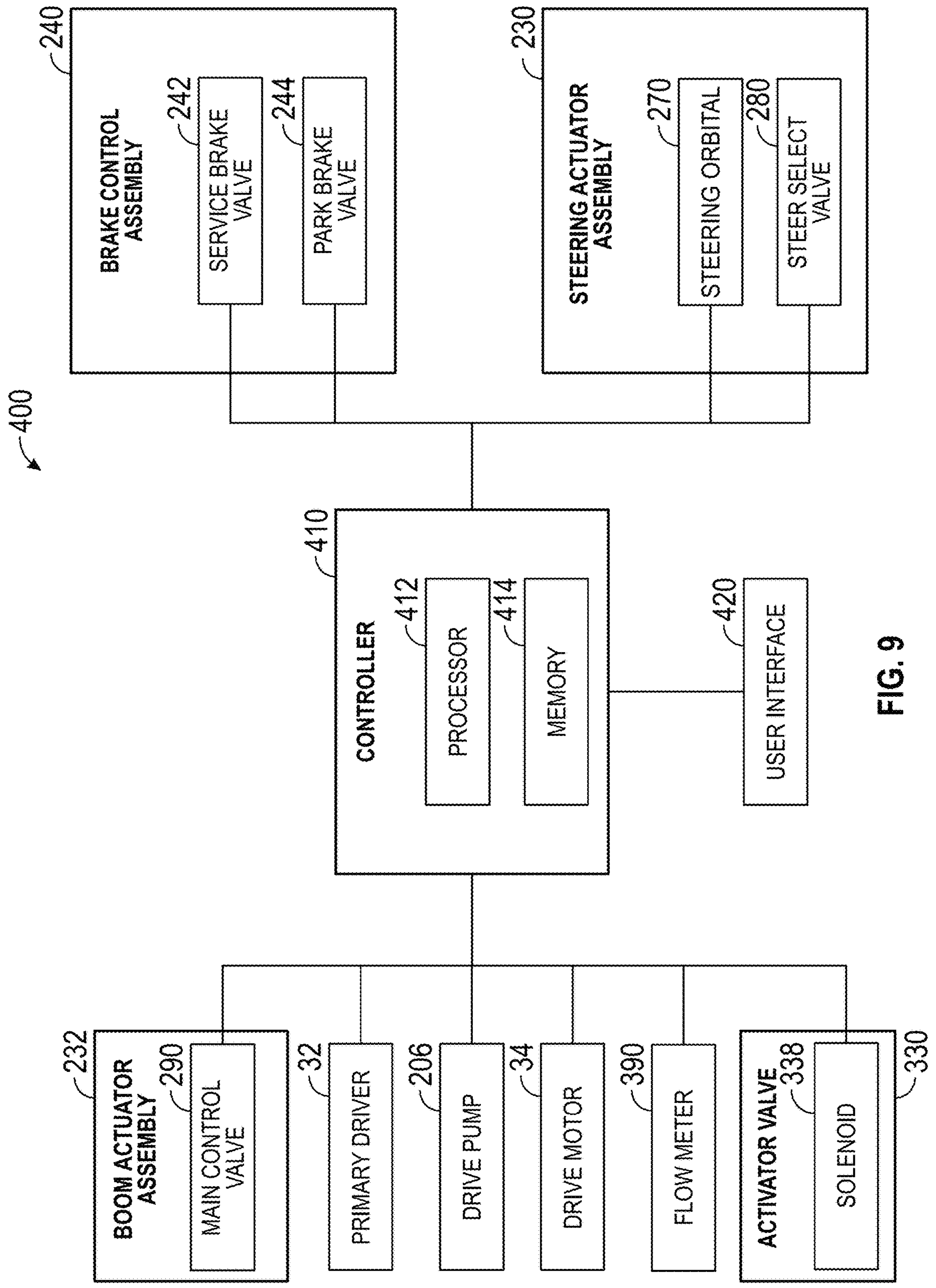
FIG. 9 is a block diagram of a control system of the telehandler of FIG. 1
Figure 10:
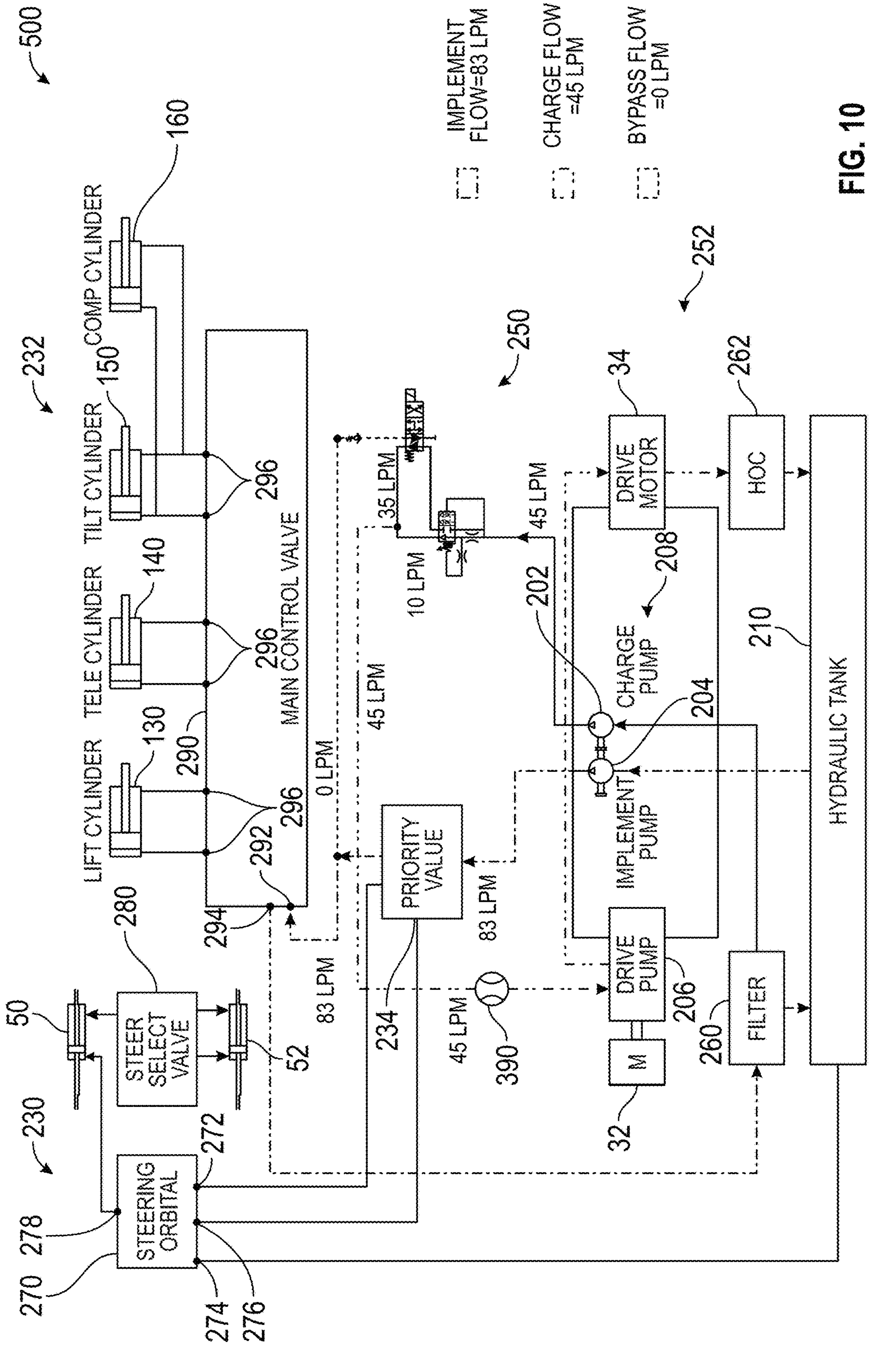
FIG. 10 is a schematic of a hydraulic system of the telehandler of FIG. 1 in a first configuration, according to another embodiment.
Figure 11:
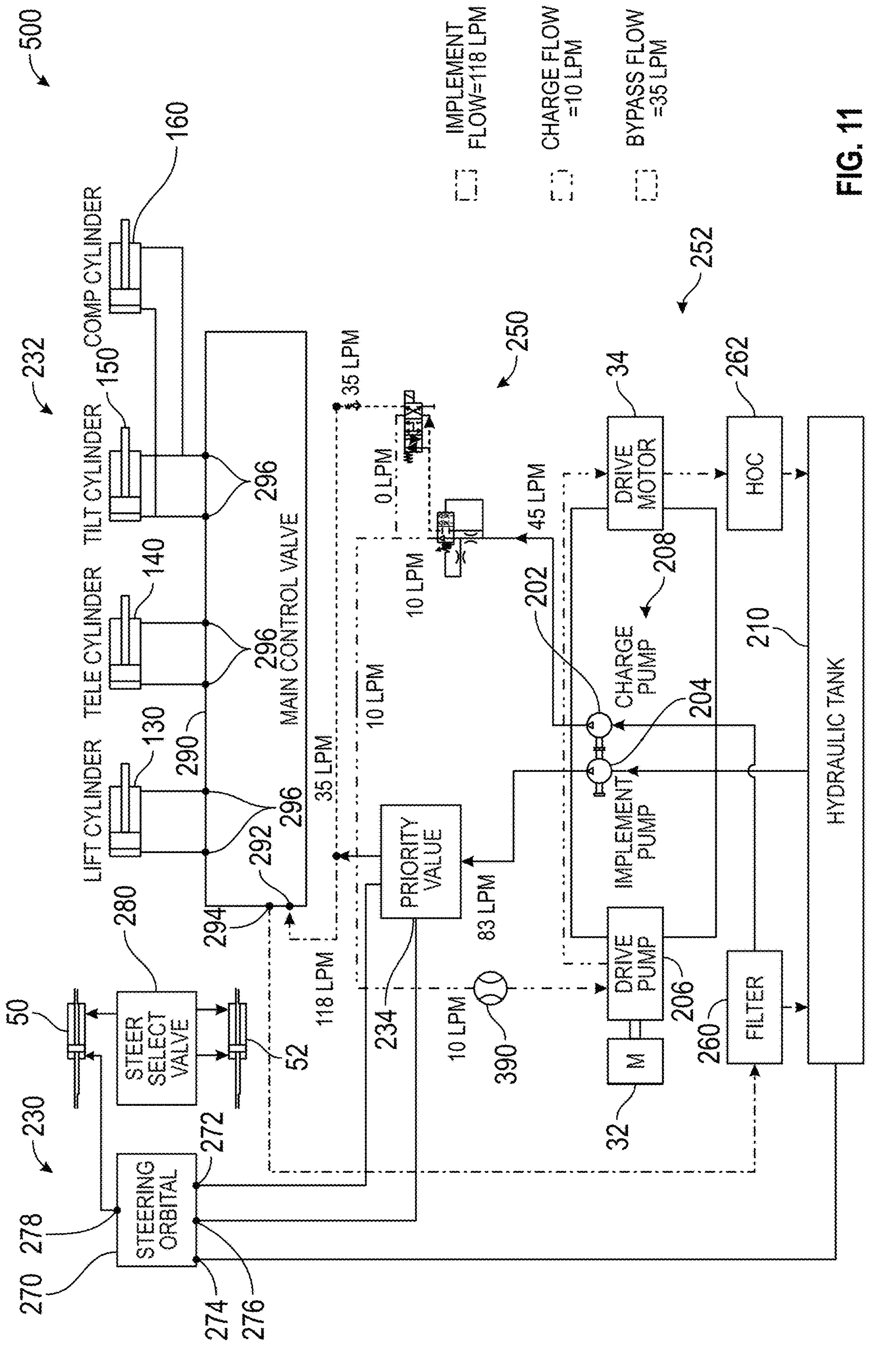
FIG. 11 is a schematic of the hydraulic system of FIG. 10 in a second configuration.

Referring to FIG. 9, the telehandler 10 includes a control system 400 configured to control the operation of the telehandler 10. The control system 400 includes a controller 402 including a processor 412 and a memory 414. The processor 412 is configured to issue commands to and process information from other components. The memory 414 is communicably connected to the processor 412 and includes computer code or instruction modules for executing one or more processes described herein.

The control system 400 includes a user interface or operator interface, shown as user interface 420. The user interface 420 may provide information to a user (e.g., through a display, lights, speakers, haptic feedback devices, etc.). The user interface 420 may receive information (e.g., commands) from a user (e.g., through a touchscreen, buttons, switches, levers, knobs, pedals, a steering wheel, etc.). The controller 410 may control operation of the telehandler 10 based on commands provided by an operator through the user interface 420.

Referring still to FIG. 9, the controller 410 is operatively coupled to and configured to at least one of (a) receive information from or (b) provide information (e.g., commands) to several components of the hydraulic system 200.

The controller 410 is operatively coupled to the boom control assembly 232. By way of example, the controller 410 may operate the main control valve 290 to control movement of the boom assembly 100. The controller 410 is operatively coupled to the primary driver 32. By way of example, the controller 410 may monitor and/or control an output speed of the primary driver 32. The controller 410 is operatively coupled to the drive pump 206 and the drive motor 34. By way of example, the controller 410 may monitor and/or control a displacement of the drive pump 206 and/or the drive motor 34. The controller 410 is operatively coupled to the flow meter 390 and the solenoid 338. By way of example, the controller 410 may monitor the flow rate through the flow meter 390 and deactivate the solenoid 338 when the flow rate is below the minimum required flow rate. The controller is operatively coupled to the brake control assembly 240. By way of example, the controller 410 may activate the service brake valve 242 and/or the park brake valve 244. The controller 410 is operatively coupled to the steering control assembly 230. By way of example, the controller 410 may control the steering orbital 270 to control the steering direction of the telehandler 10. By way of another example, the controller 410 may control the steer select valve 280 to switch between various steering modes. Although the controller 410 is shown as being operatively coupled to certain components of the telehandler 10, it should be understood that the controller 410 may communicate with any component of the telehandler 10.

Referring to FIGS. 3-9, during operation of the telehandler 10, the controller 410 may control activation of the charge flow diverter valve assembly 250 (e.g., switching between the energized configuration and the deenergized configuration). Specifically, the controller 410 may control the activator valve 330 by supplying an electrical signal to the solenoid 338. In other embodiments, the controller 410 may control the activator valve 330 by supplying a pneumatic or hydraulic pressure, or through another method. For simplicity, activation of the activator valve 330 to energize the charge flow diverter valve assembly 250 is referred to herein as activating or energizing the solenoid 338, although it should be understood that the activator valve 330 may be otherwise controlled.

It may be advantageous to supply all of the fluid from the charge pump 202 to the drive pump 206 whenever the telehandler 10 is driving. Accordingly, the controller 410 may deactivate the solenoid 338 in response to a determination that the telehandler 10 is driving or is predicted to be driving in the near future (e.g., based on an operating state of the drive pump 206 and the drive motor 34). By way of example, the controller 410 may deactivate the solenoid 338 when the speed of the telehandler 10 exceeds a threshold speed. In one such example, the controller 410 may deactivate the solenoid 338 whenever the drive motor 34 is not stationary (e.g., is driving at any speed). The speed of the telehandler 10 may be measured (e.g., by one or more sensors). Additionally or alternatively, the speed of the telehandler 10 may be determined based on commands provided by the controller 410 (e.g., a command to the drive pump 206 to drive the drive motor 34). In some embodiments, the controller 410 deactivates the solenoid 338 in response to a command from a user (e.g., through the user interface 420) instructing the telehandler 10 to drive.

It may be advantageous to divert fluid from the charge pump 202 to an actuator of the telehandler 10 (e.g., one of the cylinders of the boom control assembly 232) when the actuator is in use. Accordingly, the controller 410 may activate the solenoid 338 in response to a determination that the main control valve 290 is supplying fluid to an actuator or will be supplying fluid to an actuator in the near future (e.g., based on an operating state of the main control valve 290 or one of the actuators controlled by the main control valve). By way of example, the controller 410 may activate the solenoid 338 in response to the controller 410 providing a command to activate an actuator (e.g., a command to the main control valve 290 to extend the telescoping cylinder 140). By way of example, the controller 410 may activate the solenoid 338 in response to a command from a user (e.g., through the user interface 420) requesting movement of the boom assembly 100.

In some embodiments, the controller 410 is only configured to activate the solenoid 338 to supplement the fluid flow to certain actuators. Such actuators may be selected based on the amount of fluid that the actuator requires to move throughout a corresponding range of motion. An actuator that requires a relatively large volume of liquid to move through its entire range of motion may experience a significant time savings when operating at an elevated speed (e.g., due an increased flow rate of fluid being supplied to the actuator). In contrast, an actuator that requires a relatively small volume of liquid to move through its entire range of motion may not experience as significant of a time savings. By way of example, the lift cylinders 130 may require a relatively large volume of liquid for travel due to a relatively large bore size that facilitates lifting large weights. By way of another example, the telescoping cylinder 140 may require a relatively large volume of liquid for travel due to a relatively long stroke length that facilitates extended boom travel. By way of another example, the tilt cylinder 150 may require a relatively small volume of liquid for travel due to a relatively short stroke length and a relatively small bore size. Accordingly, the controller 410 may activate the solenoid 338 when the lift cylinders 130 or the telescoping cylinders 140 are being actuated, whereas the controller 410 may not activate the solenoid 338 when the tilt cylinder 150 is activated.

In some embodiments, the controller 410 is configured to control the solenoid 338 based on the direction of motion of an actuator (e.g., whether a hydraulic cylinder is extending or retracting). By way of example, the controller 410 may activate the solenoid 338 in response to an indication that an actuator is extending, whereas the controller 410 may not activate the solenoid 338 in response to an indication that the actuator is retracting. When retracting, a hydraulic cylinder may require a relatively small volume of fluid, due to the volume of the rod end chamber of the cylinder that is taken up by the cylinder rod. Accordingly, the retraction of the cylinder may not experience as significant of a time savings due to an increase in flow rate of the supplied fluid as the cylinder would when extending. Additionally, some actuators are positioned such that they are biased by gravity to retract. Accordingly, the retraction of such a cylinder may not benefit from the additional flow rate, as gravity already causes the cylinder to retract quickly. In one embodiment, the controller 410 is configured to activate the solenoid 338 in response to an indication that the lift cylinders 130 and/or the telescoping cylinder 140 are extending, but the controller 410 does not activate the solenoid 338 in response to an indication that the lift cylinders 130 and/or the telescoping cylinder 140 are retracting.

In one embodiment, the telehandler 10 is configured such that the controller 410 controls the solenoid 338 based on (a) whether the telehandler 10 stationary or driving and (b) the direction of the lift cylinders 130 and the telescoping cylinder 140. In this embodiment, the controller 410 is configured to deactivate the solenoid 338 whenever the telehandler 10 is driving, maximizing the charge flow supplied to the drive pump 206 when the drive motor 34 is being driven. The controller 410 is configured to activate the solenoid 338 when the lift cylinders 130 and/or the telescoping cylinder 140 are extending in order to maximize the movement speed of the boom assembly 100. The controller 410 is not configured to activate the solenoid 338 when the lift cylinders 130 and/or the telescoping cylinder 140 are retracting. Accordingly, in this embodiment, the controller 410 activates the solenoid 338 only (a) when the telehandler 10 is stationary and the lift cylinders 130 are extending or (b) when the telehandler 10 is stationary and the telescoping cylinder 140 is extending.

Hydraulic System with Alternative Charge Flow Diverter Valve Assembly

Referring to FIGS. 10-13, a hydraulic system 500 is shown as an alternative embodiment of the hydraulic system 200. The hydraulic system 500 may be substantially similar to the hydraulic system 200 except as otherwise specified herein. As shown, the hydraulic system 500 omits the service brake valve 242 and the park brake valve 244. In other embodiments, the hydraulic system 500 includes the service brake valve 242 and/or the park brake valve 244.

The hydraulic system 500 omits the charge flow diverter valve assembly 250 and instead includes a charge flow diverter valve assembly 550. The charge flow diverter valve assembly 550 may be substantially similar to the charge flow diverter valve assembly 250, except as otherwise specified herein. The charge flow diverter valve assembly 550 performs similar functions to the charge flow diverter valve assembly 250. Specifically, the charge flow diverter valve assembly 550 is configured to direct flow from the charge pump 202 to the drive pump 206 and/or the main control valve 290 based on the activation state of a solenoid. However, the charge flow diverter valve assembly 550 has a different internal structure than the charge flow diverter valve assembly 250.

The charge flow diverter valve assembly 550 omits the activator valve 330, such that flow from the charge pump 202 is not permitted to bypass the diverter valve 350 (i.e., all of the flow from the charge pump 202 passes through the diverter valve 350). As shown, the diverter valve 350 is directly fluidly coupled to the inlet port 320. The diverter valve 350 directs flow to either the drive outlet port 322 or to a point 552 positioned downstream of the diverter valve 350. By way of example, the diverter valve 350 may direct a first portion of the flow to the drive outlet port 322 and a second portion of the flow to the point 552. The point 552 is fluidly coupled to a directional control valve, shown as activator valve 560, such that the activator valve 560 is positioned downstream of the diverter valve 350. The activator valve 560 directs the second portion of the flow from the point 552 to either the drive outlet port 322 or the boom outlet port 324. The diverter valve 350 is positioned between the activator valve 560 and the inlet port 320.

Figure 12:
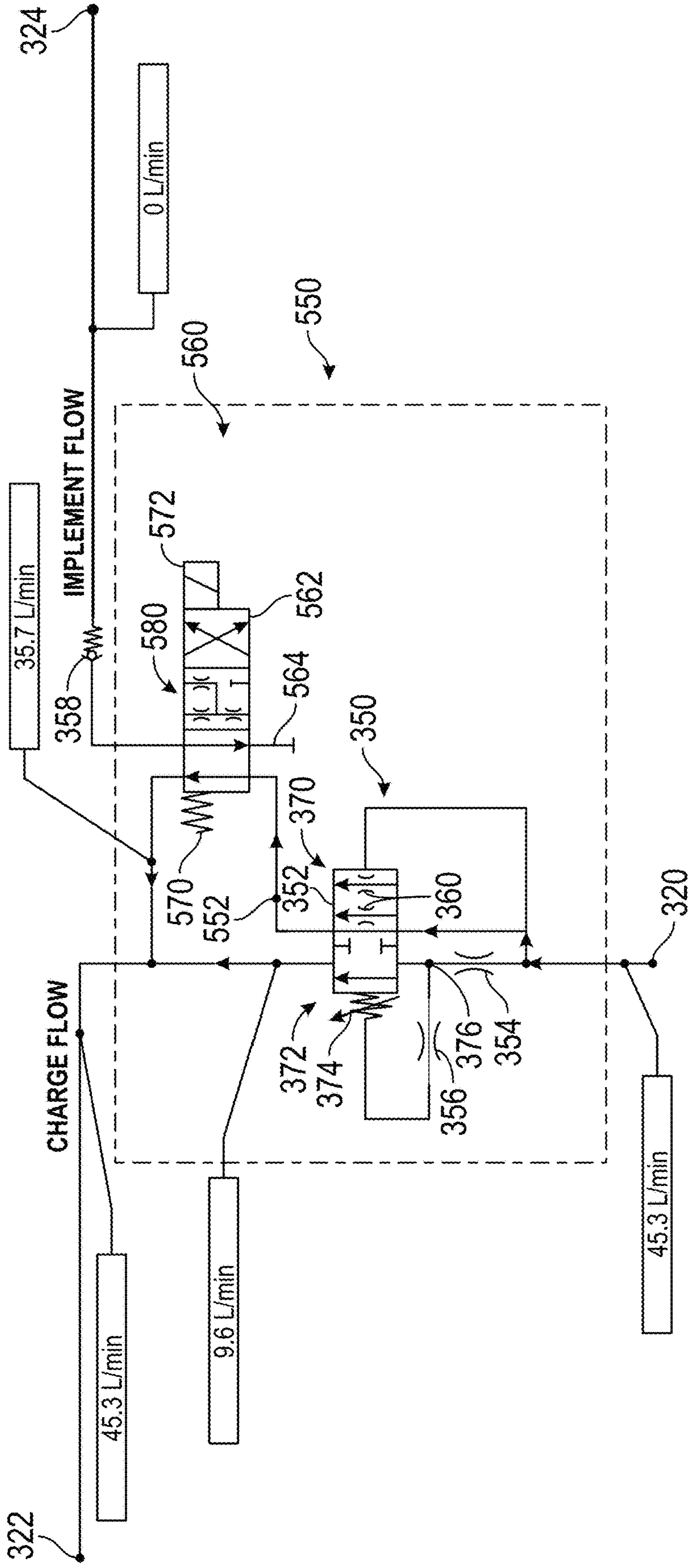
FIG. 12 is a schematic of a charge flow diverter valve assembly of the hydraulic system of FIG. 11 in the first configuration.
Figure 13:
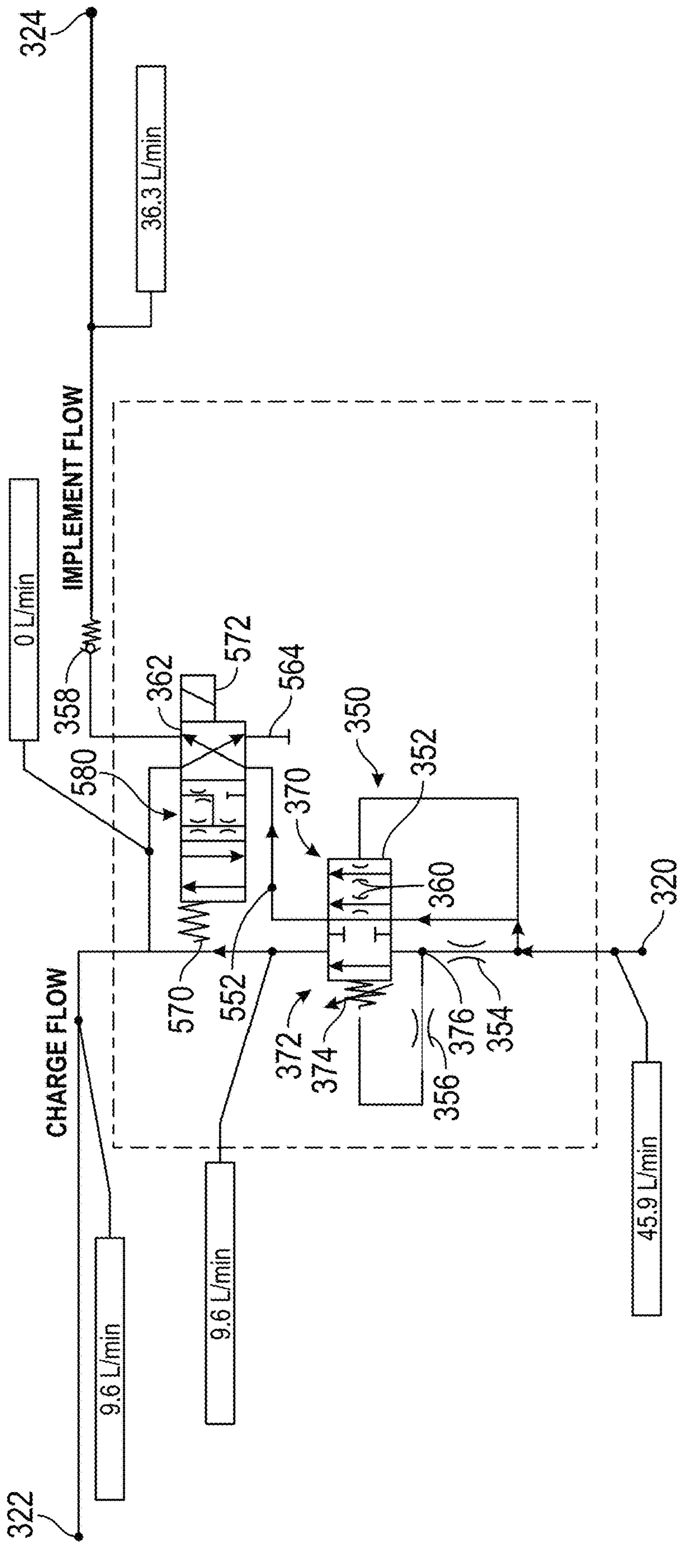
FIG. 13 is a schematic of the charge flow diverter valve assembly of the hydraulic system of FIG. 11 in the second configuration.

The activator valve 560 includes a flow control element or spool, shown as valve element 562, that is selectively repositionable between a first position, default position, or inactive position, shown in FIG. 12, and a second position or active position, shown in FIG. 13. In the inactive position, the valve element 562 fluidly couples the point 552 to the drive outlet port 322. Accordingly, any flow directed by the diverter valve 350 to the point 552 is redirected by the activator valve 560 back to the drive outlet port 322. As such, with the activator valve 560 in the inactive position, any flow received by the charge flow diverter valve assembly 550 is directed to the drive outlet port 322. In the inactive positon, the valve element 562 further fluidly couples the check valve 358 to a stop or plug 564. Accordingly, backward flow from the boom outlet port 324 is prevented, both by the check valve 358 and the plug 564.

In the active position, the valve element 562 fluidly couples the point 552 to the check valve 358, such that the valve element 562 fluidly couples the point 552 to the boom outlet port 324 through the check valve 358. With the valve element in the active position, the activator valve 560 directs flow from the point 552 to the boom outlet port 324 through the check valve 358. In the active position, the valve element 562 further fluidly couples the drive outlet port 322 to the plug 564. Accordingly, backward flow from the drive outlet port 322 through the valve element 362 is prevented by the plug 564.

The activator valve 560 includes a biasing element (e.g., a compression spring), shown as spring 570, that is coupled to the valve element 562. The spring 570 biases the valve element 562 toward the inactive position. The activator valve 560 further includes a valve actuator (e.g., an electric actuator, a pneumatic actuator, a hydraulic actuator, etc.), shown as solenoid 572, that is coupled to the valve element 332. When activated, the solenoid 572 forces the valve element 562 to the active position. When the solenoid 572 is deactivated, the spring 570 returns the valve element 562 to the inactive position. The solenoid 572 performs a similar function to the solenoid 338 (e.g., activating or deactivating the activator valve 560 versus activating or deactivating the activator valve 330). Accordingly, any control logic described herein with respect to the solenoid 338 may also apply to the solenoid 572. By way of example, the controller 410 may deactivate the solenoid 572 in response to a determination that the telehandler 10 is driving or is predicted to be driving in the near future. By way of another example, the controller 410 may activate the solenoid 572 in response to a determination that the main control valve 290 is supplying fluid to an actuator or will be supplying fluid to an actuator in the near future.

Referring to FIGS. 12 and 13, the valve element 562 includes a central portion or middle portion, shown as middle portion 580. In some embodiments, the valve element 562 is repositionable into a third position or middle position in which the middle portion 580 is in communication with the point 552, the drive outlet port 322, and the boom outlet port 324. When in the middle position, the middle portion 580 fluidly couples the point 552 to both the drive outlet port 322 and the boom outlet port 324. The middle portion 580 may include one or more flow restrictors or orifices that restrict flow between (a) the point 552 and (b) the drive outlet port 322 and the boom outlet port 324.

In some embodiments, the valve element 562 is configured to temporarily shift into the middle position whenever the valve element 562 changes between the active position and the inactive positon. Because the middle portion 580 puts the point 552 in fluid communication with both the drive outlet port 322 and the boom outlet port 324, temporarily shifting to the middle position may lessen the shock (e.g., a rapid change in pressure or flow rate) experienced by the system 500, as compared to a configuration where the middle portion 580 is omitted and the valve element 562 shifts directly between the active position and the inactive position. In other embodiments, the valve element 562 can be manually reconfigured into the middle position (e.g., for maintenance or troubleshooting purposes).

As utilized herein, the terms “approximately,” “about,” “substantially,” and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the telehandler 10 as shown in the various exemplary embodiments is illustrative only. Additionally, any element disclosed in one embodiment may be incorporated or utilized with any other embodiment disclosed herein.

What is claimed is:

1. A lift device, comprising:

a chassis;

an implement;

a hydraulic actuator configured to move the implement relative to the chassis;

an implement circuit including a first pump coupled to the hydraulic actuator;

a charge circuit including a second pump configured to selectively provide a flow of pressurized fluid to the implement circuit;

a valve assembly fluidly coupled to the implement circuit and the charge circuit; and processing circuitry configured to:

in a first mode of operation, control the valve assembly to direct the flow of pressurized fluid from the second pump to the charge circuit;

in a second mode of operation, control the valve assembly to divert the flow of pressurized fluid from the second pump to the implement circuit; and reconfigure the lift device between the first mode of operation and the second mode of operation in response to a command for the hydraulic actuator to at least one of move the implement or reconfigure the implement.

2. The lift device of claim 1, wherein the valve assembly includes a valve element and a solenoid operatively coupled to the processing circuitry.

3. The lift device of claim 2, wherein the processing circuitry is configured to either energize or deenergize the solenoid to reconfigure the lift device between the first mode of operation and the second mode of operation.

4. The lift device of claim 1, wherein the processing circuitry is configured to reconfigure the lift device from the first mode of operation to the second mode of operation in response to the command for the hydraulic actuator to at least one of move the implement or reconfigure the implement.

5. The lift device of claim 1, further comprising a user interface operatively coupled to the processing circuitry, wherein the command for the hydraulic actuator to move the implement is a request from a user received by the user interface.

6. The lift device of claim 1, wherein the processing circuitry is configured to reconfigure the lift device between the first mode of operation and the second mode of operation in response to a command to drive the lift device.

7. The lift device of claim 6, wherein the processing circuitry is configured to reconfigure the lift device from the second mode of operation to the first mode of operation in response to the command to drive the lift device.

8. The lift device of claim 6, further comprising a user interface operatively coupled to the processing circuitry, wherein the command to drive the lift device is a request from a user received by the user interface.

9. The lift device of claim 1, wherein the processing circuitry is configured to reconfigure the lift device between the first mode of operation and the second mode of operation in response to a determination that the lift device is driving.

10. The lift device of claim 9, wherein the processing circuitry is configured to reconfigure the lift device from the second mode of operation to the first mode of operation in response to the determination that the lift device is driving.

11. The lift device of claim 1, wherein the charge circuit further includes a drive pump, further comprising a hydraulic motor fluidly coupled to the drive pump and configured to drive the lift device.

12. A lift device, comprising:

a chassis;

an implement;

a hydraulic actuator configured to move the implement relative to the chassis;

an implement circuit including a first pump coupled to the hydraulic actuator;

a charge circuit including a second pump configured to selectively provide a flow of pressurized fluid to the implement circuit;

an activator valve repositionable between a first position and a second position; and a diverter valve fluidly coupled to the activator valve, wherein all of the flow from the second pump passes through at least one of the activator valve or the diverter valve and is directed to the charge circuit when the activator valve is in the first position;

wherein the diverter valve is configured to divert a portion of the flow from the second pump to the implement circuit when the activator valve is in the second position;

wherein the charge circuit is fluidly coupled to the implement circuit through the activator valve at least one of (a) when the activator valve is in the first position or (b) when the activator valve is in the second position; and wherein the portion of the flow from the second pump diverted by the diverter valve passes through the activator valve when the activator valve is in the second position.

13. The lift device of claim 12, wherein all of the flow from the second pump passes through the diverter valve when the activator valve is in the second position.

14. The lift device of claim 12, wherein the portion of the flow from the second pump diverted by the diverter valve passes through the activator valve after leaving the diverter valve and before reaching the hydraulic actuator when the activator valve is in the second position.

15. The lift device of claim 12, further comprising processing circuitry operatively coupled to the activator valve and configured to reposition the activator valve between the first position and the second position.

16. The lift device of claim 15, wherein the processing circuitry is configured to reposition the activator valve from the first position to the second position in response to a command to at least one of move the implement or reconfigure the implement.

17. A method of operating a lift device, the method comprising:

providing, by a charge pump, a first flow of pressurized fluid;

receiving, by a user interface, a first request from a user to propel the lift device;

controlling, by processing circuitry operatively coupled to the user interface, a valve assembly to direct all of the first flow of pressurized fluid to a charge circuit in response to receiving the first request;

providing, by the charge pump, a second flow of pressurized fluid;

receiving, by the user interface, a second request from the user to at least one of reposition or reconfigure an implement of the lift device; and in response to receiving the second request, controlling, by the processing circuitry, the valve assembly to both (a) direct a first portion of the second flow of pressurized fluid to the charge circuit and (b) direct a second portion of the second flow of pressurized fluid to an implement circuit.

18. The method of claim 17, wherein the charge circuit includes a drive pump configured to power a hydraulic motor to propel the lift device.

19. The method of claim 17, wherein the implement circuit includes a hydraulic actuator configured to reposition the implement.

20. The method of claim 17, wherein directing, by the valve assembly, the second portion of the second flow of pressurized fluid to the implement circuit includes activating a valve actuator to reposition a valve element of the valve assembly such that the valve element diverts the second portion of the second flow of pressurized fluid to the implement circuit.

* * * * *